(12) United States Patent
Mukai et al.

(10) Patent No.: US 6,995,522 B2
(45) Date of Patent: Feb. 7, 2006

(54) PHASE CONTROLLER

(75) Inventors: Tatsuya Mukai, Tsu (JP); Nobuhiro Kitamura, Katano (JP); Yukihiro Murata, Hirakata (JP); Kenji Okada, Nishinomiya (JP)

(73) Assignee: Matsushita Electric Works, Ltd., Osaka (JP)

( * ) Notice: Subject to any disclaimer, the term of this patent is extended or adjusted under 35 U.S.C. 154(b) by 22 days.

(21) Appl. No.: 10/875,205

(22) Filed: Jun. 25, 2004

(65) Prior Publication Data

US 2004/0263088 A1 Dec. 30, 2004

(30) Foreign Application Priority Data

Jun. 27, 2003 (JP) ............................. 2003-185744
Jul. 31, 2003 (JP) ............................. 2003-284185

(51) Int. Cl.
*H05B 41/16* (2006.01)
*H05B 37/02* (2006.01)
*G05F 1/00* (2006.01)

(52) U.S. Cl. ..................... 315/247; 315/225; 315/308
(58) Field of Classification Search ............ 315/209 R, 315/224–226, 246, 247, 360, 307–308, 291, 315/DIG. 7; 323/217; H05B 41/16, 37/02; G05B 1/00
See application file for complete search history.

(56) References Cited

U.S. PATENT DOCUMENTS 3,146,392 A * 8/1964 Sylvan ...................... 323/326
3,780,252 A * 12/1973 Crapuchettes ............... 219/716
5,038,081 A    8/1991 Maiale et al. ............... 315/291
5,274,208 A * 12/1993 Noda ......................... 219/715
5,571,439 A * 11/1996 Daley et al. ................ 219/716
2003/0127997 A1* 7/2003 Shoji et al. ................. 315/291
2003/0173908 A1* 9/2003 Henze ........................ 315/291

FOREIGN PATENT DOCUMENTS

JP    2507848    4/1996
JP    2920771    4/1999

* cited by examiner

*Primary Examiner*—Thuy Vinh Tran
(74) *Attorney, Agent, or Firm*—Greenblum & Bernstein P.L.C.

(57) ABSTRACT

In a phase controller used in a light control of an incandescent lamp, noise reduction, prevention of elements from damage due to short circuit current, downsizing and lower cost are purposed. A CPU circuit of a control circuit sets a gradual increase term during which a load voltage applied to the incandescent lamp is gradually increased by driving a self-quenching type switching device such as an IGBT. After passing the gradual increase term, a main switching device such as a TRIAC is turned on. The phase controller further comprises a current sensor such as a shunt resistor for sensing a value of the load current flowing through the self-quenching type switching device, according to need. The CPU circuit compares the sensed value of the load current with at least one reference value, and selects driving manner of the main switching device and the self-quenching type switching device corresponding to the result of comparison.

20 Claims, 22 Drawing Sheets

FIG. 7A
FIG. 7B
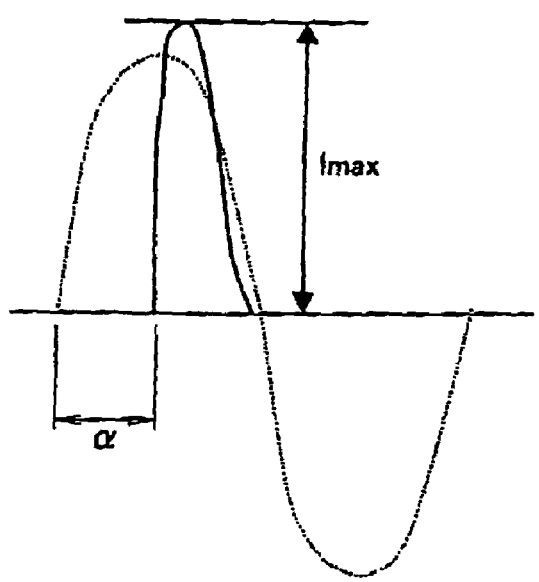
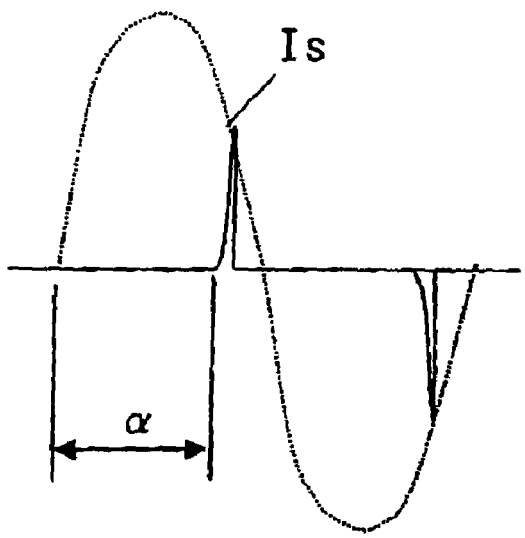

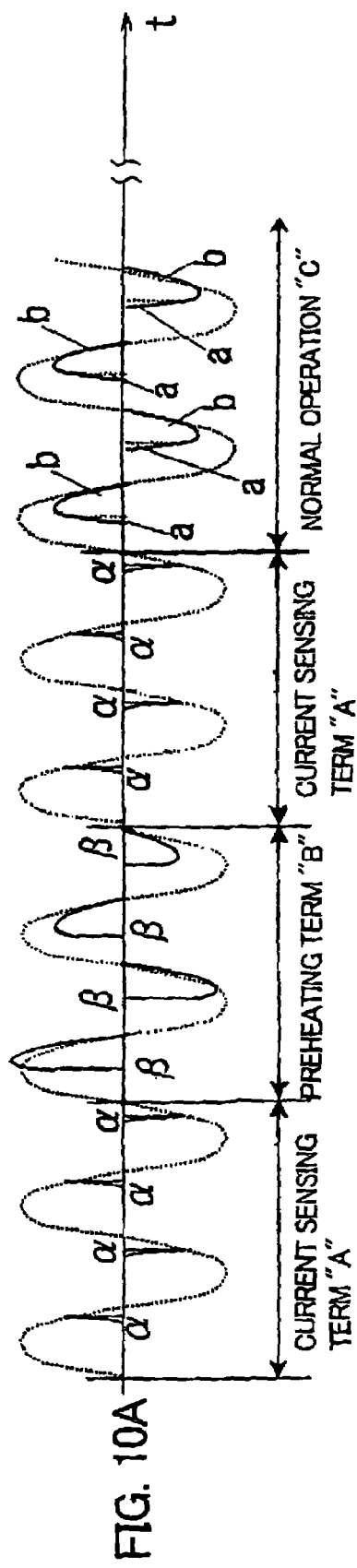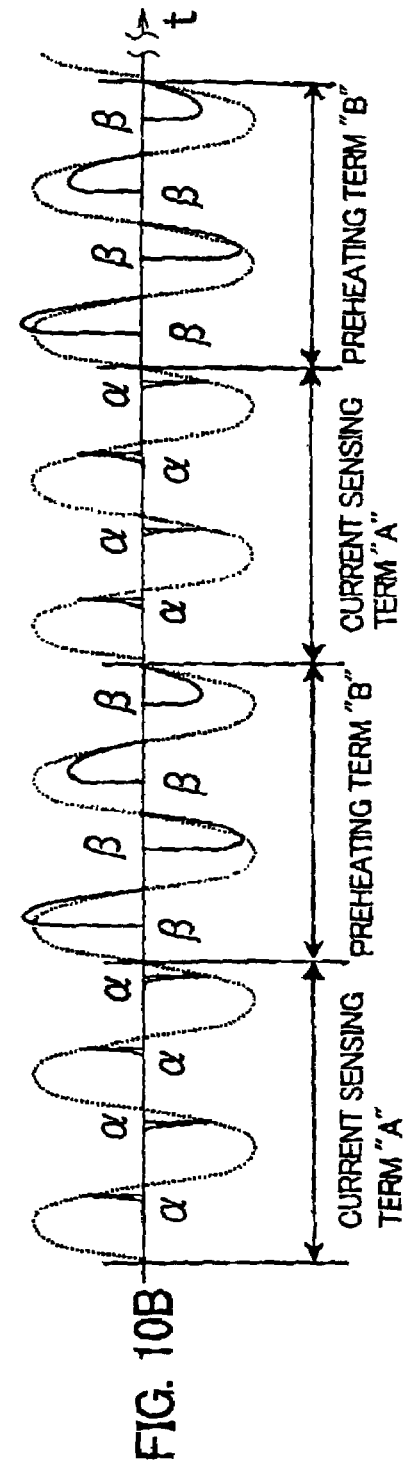

PHASE CONTROLLER

BACKGROUND OF THE INVENTION

1. Field of the Invention

The present invention relates to a phase controller used as a light controller of an incandescent lamp.

2. Description of the Related Art

A phase controller using a bilateral thyristor (hereinafter called TRIAC) is conventionally used as a light controller of an incandescent lamp. Circuit diagrams of typical phase controllers are shown in FIGS. 22A to 22C.

The phase controller has two terminals respectively connected between both terminals of a series circuit of a commercial power source AC and a load such as an incandescent lamp LA. As shown in FIG. 22A, a TRIAC Q1 is connected in parallel with the series circuit of the commercial power source AC and the incandescent lamp LA. A trigger circuit T is configured by a damping time circuit which is a series circuit of a resistor R1, a variable resistor R2 and a capacitor C1, a DIAC Q5 connected between a connection point of the capacitor C1 and the variable resistor R2 and a gate terminal of the TRIAC Q1, a reverse series circuit of two Zener diodes ZD1 and ZD2 connected between both terminals of a series circuit of the variable resistor R2 and the capacitor C1 for maintaining a voltage between the both terminals constant. A phase controller shown in FIG. 22B uses a trigger circuit T in which an SBS (silicon bilateral switch) Q5' is used instead of the DIAC Q5.

In the conventional phase controllers, when a voltage of the capacitor C1 which is charged through the resistor R1 and the variable resistor R2 reaches to a breakover voltage of the DIAC Q5, or when a voltage applied to a cathode of a Zener diode ZD3 which is connected to a gate of the SBS Q5' becomes higher than a Zener voltage and a gate current flows into the SBS Q5', the DIAC Q5 or the SBS Q5' is turned on. Thus, electric charge in the capacitor C1 is released as a gate current "i", so that the TRIAC Q1 is turned on.

On the other hand, a conventional phase controller shown in FIG. 22C is configured for flowing the gate current to the TRIAC Q1 from a predetermined phase angle to a zero-cross point of an AC voltage through a diode bridge DB by a transistor Q6, without using the DIAC or the SBS.

In these phase controllers, the TRIAC Q1 is turned on at a predetermined phase angle of the commercial power source AC so as to flow a load current of the incandescent lamp LA to the TRIAC Q1. Thus, when the phase angle is near to 90 degrees, a waveform of the load current shows precipitous rising up. Especially, a value of di/dt of the TRIAC Q1 at the turning on thereof is much larger, so that high frequency noise (150 kHz to 30 MHz) occurs. Furthermore, a filament of the incandescent lamp LA is vibrated due to the precipitous load current, so that acoustic noise further occurs.

For preventing the occurrence of the noises, in the conventional phase controller, a capacitor C0 (or a series circuit of capacitors C0 and C0') is connected in parallel with the series circuit of the commercial power source AC and the incandescent lamp LA, and a reactance element L is connected between the series circuit of the commercial power source AC and the incandescent lamp LA and the TRIAC Q1, as shown in the figures. By such a configuration, the rising up of the load current becomes fluent so that the occurrence of the noises is reduced.

In the conventional phase controller, a very large reactance element L is necessary for reducing level of the noises satisfying a value of a standard such as IEC. Thus, the phase controller will be upsized. Furthermore, the reactance element L generates acoustic noise and/or heat. The phase controller used for large load shows such the tendency.

According to the Japanese Patent No. 2507848 or No. 2920771, a switching device such as a MOSFET, an IGBT (insulated gate bipolar transistor) or a power transistor is used as a phase control device instead of the TRIAC or thyristor.

Since a resistance of the switching device such as the MOSFET when the switching device is turned on is larger than that of the TRIAC, it is necessary to enlarge a radiator. Thus, the phase controller is upsized inevitably. Alternatively, for reducing the resistance of the switching device substantially equal to the resistance of the TRIAC, it is necessary to upsize the switching device itself. Thus, the phase controller becomes costly corresponding to upsizing the switching device.

SUMMARY OF THE INVENTION

A purpose of the present invention is to provide a compact and inexpensive phase controller, which can reduce the occurrence of the high frequency noise, even when a large capacity incandescent lamp is connected.

For realizing the above-mentioned purpose, a phase controller in accordance with an aspect of the present invention is connected between an AC power source and a load such as an incandescent lamp for executing light control of the incandescent lamp. The phase controller comprises a first switching device configured by a reverse blocking thyristor or a bilateral thyristor, a load voltage increasing circuit connected in parallel with both terminals of the first switching device, including at least one self-quenching type switching device gradually for increasing a voltage applied to the load before turning on of the first switching device, and a control circuit for controlling the driving of the first switching device and the load voltage increasing circuit.

The control circuit sets a gradual increase term in a phase control operation during which the load voltage increasing circuit is driven gradually for increasing the voltage applied to the load from a predetermined phase angle, and turns on the first switching device after passing the gradual increase term.

According to need, a load current sensor is further provided for sensing the load current, which flows through the self-quenching switching device, when the self-quenching switching device of the load voltage increasing circuit is turned on. The control circuit compares a value of the load current sensed by the load current sensor with at least one predetermined reference value, and selects manners for turning on of the first switching device and the self-quenching type switching device of the load voltage increasing circuit corresponding to result of the comparison.

By such a configuration, the voltage applied to the load through the self-quenching type switching device of the load voltage increasing circuit is gradually increased by driving the load voltage increasing circuit before turning on of the first switching device, so that the rising up of the load current flowing in the load can be made fluent. Thus, acoustic noise due to vibration of filament of the incandescent lamp can be reduced.

Furthermore, the driving manners of the first switching device and the self-quenching type switching device of the load voltage increasing circuit is selected corresponding to result of the comparison. Thus, for example, when the current flowing in the load is a short circuit current, it is possible to stop the phase control, so that the damage of the first switching device or the self-quenching type switching device can be prevented. Furthermore, the self-quenching type switching device such as the MOSFET or the IGBT can be protected from the damage due to excessive inrush current of the incandescent lamp. As a result, compact and inexpensive device of the MOSFET or the IGBT having a small tolerance with respect to the inrush current can be used, so that the phase controller can be downsized.

BRIEF DESCRIPTION OF THE DRAWINGS

FIG. 7A is a waveform chart showing a phase angle α at which the IGBT is turned on is selected near to 90 degrees in current sensing operation in a first modification of the first embodiment;

FIG. 7B is a waveform chart showing the phase angle α at which the IGBT is turned on is selected near to zero cross point in current sensing operation in the first modification of the first embodiment;

FIG. 10A is a waveform chart showing an operation of the phase controller setting only one preheating term in the third modification of the first embodiment;

FIG. 10B is a waveform chart showing another operation of the phase controller setting a plurality of preheating terms in the third modification of the first embodiment;

DETAILED DESCRIPTION OF THE EMBODIMENT

First Embodiment

A circuit diagram of a phase controller 1A in accordance with a first embodiment of the present invention is described with reference to FIG. 1.

The phase controller 1A comprises a TRIAC Q1 serving as a first switching device, an IGBT Q4 serving as a self-quenching type second switching device, a shunt resistor R6 for sensing a current value flowing in the IGBT Q4, a control circuit 10 for controlling the TRIAC Q1 and the IGBT Q4, and an external input device 2 which is used for setting a luminance ratio (or level of light control) of an incandescent lamp LA. A series circuit of the IGBT Q4 and the shunt resistor R6 is connected between both terminals of the TRIAC Q1 via a diode bridge DB. The phase controller 1A is connected between a terminal of a commercial power source AC and a terminal of the incandescent lamp LA.

Figure 1:
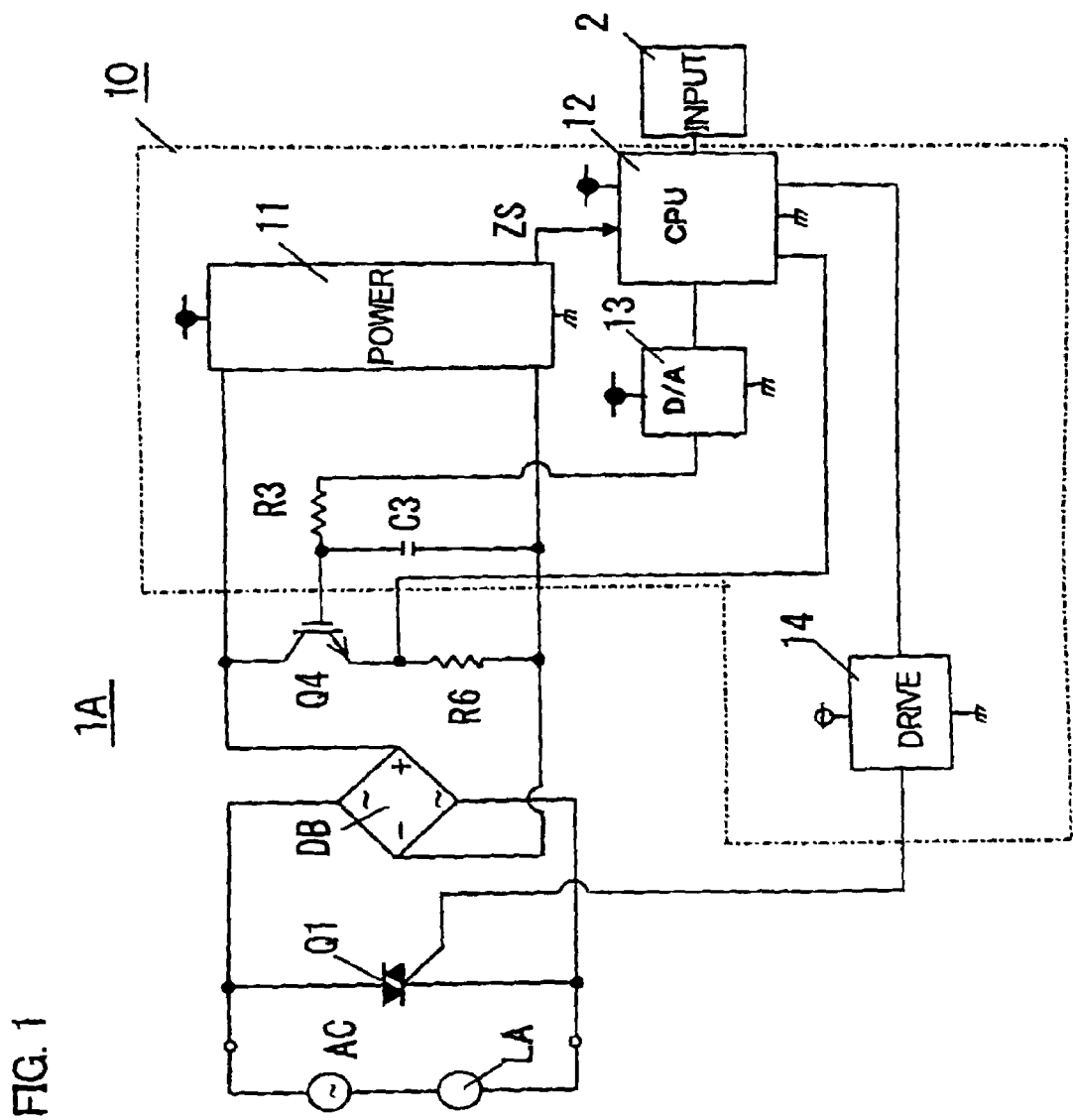
FIG. 1 is a circuit diagram showing a configuration of a phase controller in accordance with a first embodiment of the present invention.

In FIG. 1, a symbol C3 designates a capacitance in a gate of the IGBT Q4 serving as a control terminal, and a symbol R3 designates a resistor connected to the gate. The diode bridge DB, the IGBT Q4, and so on serve as a load voltage increasing circuit for increasing a load voltage applied to the incandescent lamp LA before turning on of the TRIAC Q1 serving as the first switching device.

It, however, is possible to use a reverse blocking thyristor as the first switching device instead of the TRIAC Q1. Furthermore, it is possible to use another current sensing device such as a current transformer, a Hall element, or the like instead of the shunt resistor R6.

The control circuit 10 includes a power circuit 11, a CPU circuit 12, a D/A converting circuit 13 and a driving circuit 14. The power circuit 11 has functions for converting rectified voltage output from the diode bridge DB to a predetermined DC voltage and supplies the DC voltage to each department. Furthermore, the power circuit 11 has a function for sensing a zero-cross point of an AC voltage from the commercial power source AC. The CPU circuit 12 is acted by receiving power supply from the power circuit 11. The CPU circuit 12 calculates a phase control angle for driving the TRIAC Q1 and the IGBT Q4 in a manner so that the illuminance ratio of the incandescent lamp LA becomes equal to a predetermined set value, and generates a signal corresponding to the phase control angle based on a zero-cross sensing signal ZS outputted from the power circuit 11. The D/A converting circuit 13 converts a digital control signal for driving the IGBT Q4 outputted from the CPU circuit 12 to an analogous voltage as a control signal. The driving circuit 14 supplies a signal outputted from the CPU circuit 12 to a gate of the TRIAC Q1 as one-shot trigger signal. The power circuit 11 comprises a smoothing capacitor and so on for storing electric power so as to supply the electric power while the TRIAC Q1 and the IGBT Q4 are turned on.

Subsequently, a motion of the phase controller 1A in accordance with the first embodiment is described.

When the phase controller 1A is in a ready and standby mode of the phase control, a current flows from the commercial power source AC to the power circuit 11 through the incandescent lamp LA and the diode bridge DB while a full term or predetermined term of a phase of the AC power. The power circuit 11 senses the zero-cross point and inputs the zero-cross sensing signal ZS to the CPU circuit 12, further to supplying the electric power to the CPU circuit 12. The CPU circuit 12 calculates a position of the zero-cross point based on the zero-cross sensing signal ZS outputted from the power circuit 11.

When a switching on signal and a setting signal corresponding to the illuminance ratio set by a user are inputted from the external input device 2, the CPU circuit 12 calculates a phase angle at which the illuminance ratio of the incandescent lamp LA set in the external input device 2 can be obtained. Furthermore, the CPU circuit 12 outputs a voltage as a control signal for briefly turning on the IGBT Q4 based on the zero-cross sensing signal ZS at a predetermined phase angle α at each half cycle of the commercial power source AC. Details of the predetermined phase angle α will be described later.

The CPU circuit 12 senses the intensity of the load current flowing in the shunt resistor R6 through the diode bridge DB and the IGBT Q4 as a voltage drop due to the shunt resistor R6 corresponding to the value of the current, while the IGBT Q4 is turned on. The CPU circuit 12 further compares the value of the voltage drop with a value of a reference voltage. The CPU circuit 12 executes the following judgment. First judgment is whether a current having a value corresponding to a critical value actually damaging the IGBT Q4 is flowing or not. Second judgment is whether a short circuit current having a tolerance with respect to the critical value, but larger than an inrush current of the incandescent lamp LA is flowing or not. Third judgment is whether a large inrush current by which the damage of the IGBT Q4 is supposed is flowing or not.

Figure 2:
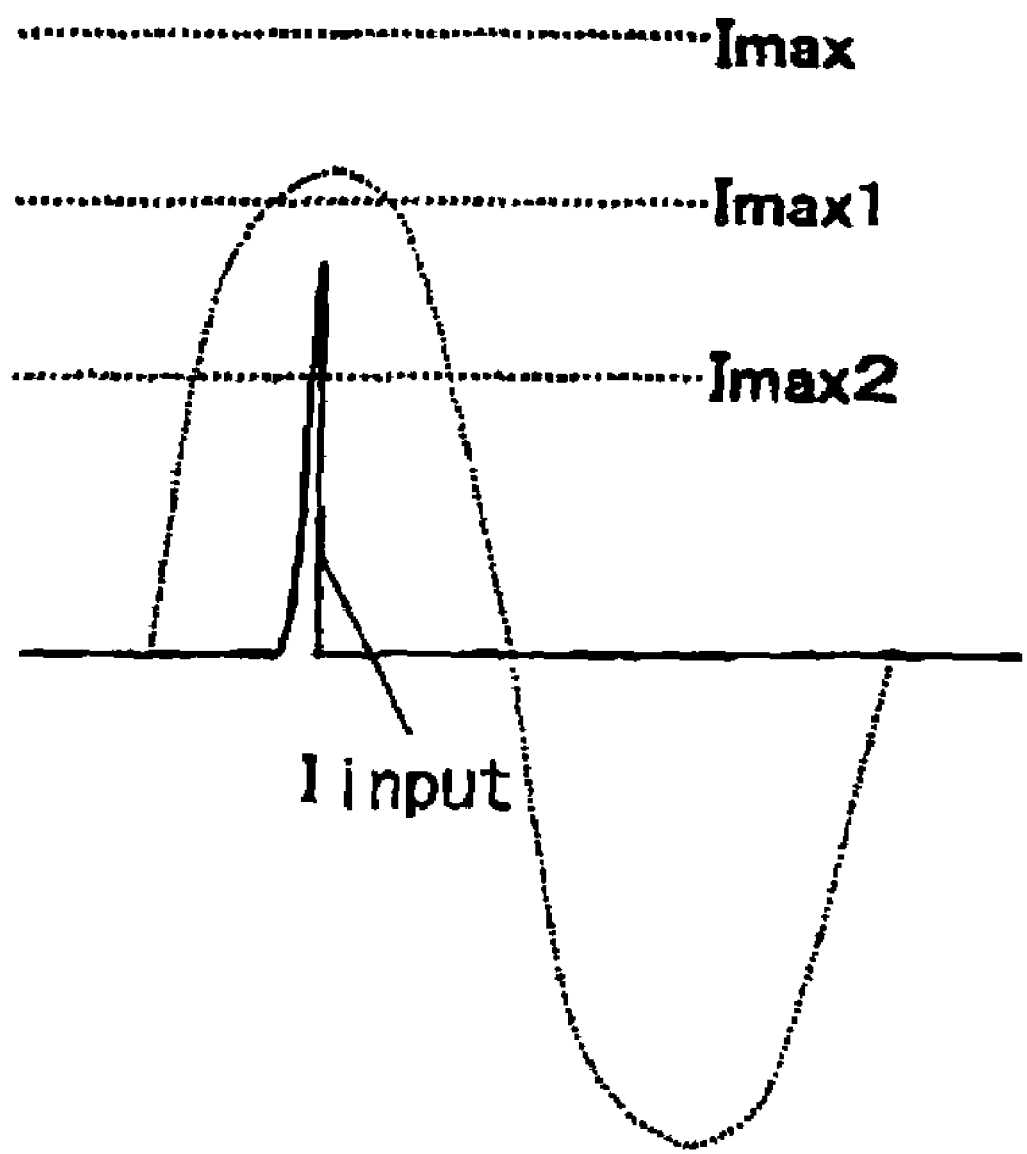
FIG. 2 is a waveform chart showing reference voltage values used in the first embodiment, where a symbol $I_{max}$ designates a reference voltage value corresponding to critical current value at which an IGBT is actually damaged, a symbol $I_{max1}$ designates a reference voltage value corresponding to a short circuit current value having a tolerance with respect to the critical current value $I_{max}$, and a symbol $I_{max2}$ designates a reference voltage value corresponding to an excessive inrush current value at which the IGBT is supposed to be damaged by the inrush current.

Specifically, a plurality of reference voltages, which are compared with a voltage value corresponding to a current value $I_{input}$ sensed in the shunt resistor R6, is set in the CPU circuit 12. The reference values are decided by basing on a correlation between a value of the inrush current actually flowing in the incandescent lamp LA with respect to each predetermined phase angle set in the external input device 2 and a value of a current flowing in the shunt resistor R6 at a phase angle α when current sensing is executed. For example, as shown in FIG. 2, three reference voltages respectively corresponding to the critical current $I_{max}$ by which the IGBT Q4 is actually damaged, the short circuit current $I_{max1}$ having a tolerance with respect to the critical current, and the excessive inrush current $I_{max2}$ by which the IGBT Q4 is supposed to be damaged.

Figure 3A:
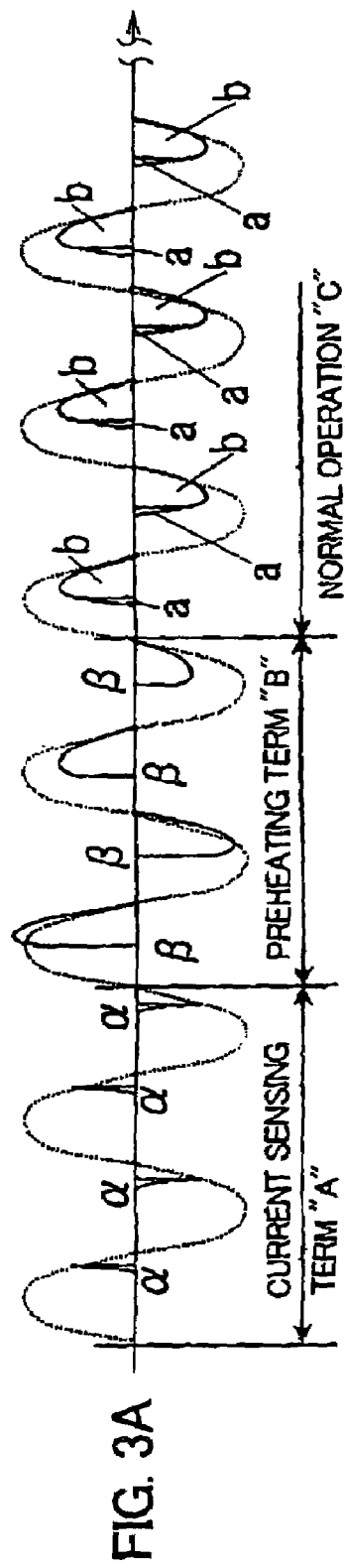
FIG. 3A is a waveform chart showing operations of the phase controller when the excessive inrush current is sensed in the first embodiment.
Figure 3B:
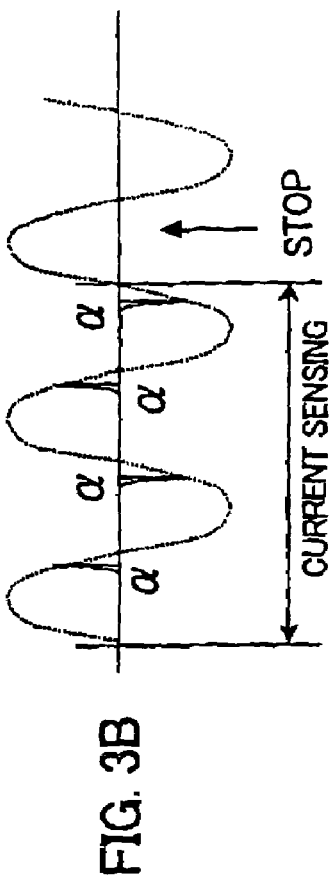
FIG. 3B is a waveform chart showing another operation of the phase controller when the short circuit current is sensed in the first embodiment.
Figure 3C:
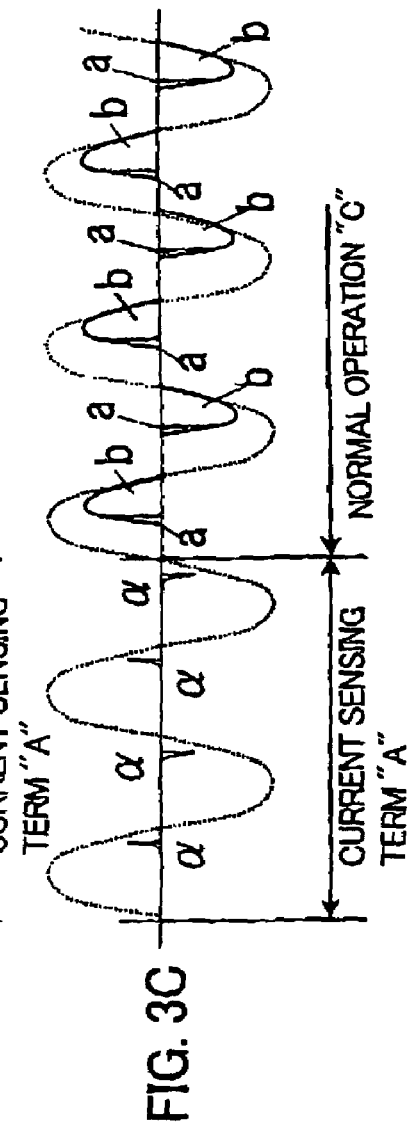
FIG. 3C is a waveform chart showing still another operation of the phase controller when a normal inrush current is sensed in the first embodiment.

As shown in FIGS. 3A to 3C, two cycles of the commercial power source AC are allocated as a current sensing term "A" for sensing a current flowing in the shunt resistor R6. The CPU circuit 12 executes over current sensing in the current sensing term "A" following to a flowchart shown in FIG. 4.

When the IGBT Q4 is briefly turned on at the predetermined phase angle α at each half cycle of the commercial power source AC (S1), the CPU circuit 12 starts to sense over current in the value $I_{input}$ of the current flowing in the shunt resistor R6 (S2). The CPU circuit 12 compares the voltage corresponding to the value of the current $I_{input}$ sensed in the shunt resistor R6 with the reference values corresponding to the critical current $I_{max}$, the short circuit current $I_{max1}$, and the excessive inrush current $I_{max2}$ (S3). When the value of the current $I_{input}$ is larger than the value of the inrush current $I_{max2}$, but smaller than the value of the short circuit current $I_{max1}$, the CPU circuit 12 sets, for example, two cycles of the commercial power source AC as a preheating term "B" after the current sensing term "A", as shown in FIG. 3A (S4). The CPU circuit 12 controls the driving circuit 14 so as to output a trigger signal for turning on the TRIAC Q1 at a phase angle near to the predetermined phase angle which is set prior to the light control at each half cycle in the preheating term "B".

In the preheating term "B", the CPU circuit 12 calculates a phase angle at which the predetermined illuminance ratio of the incandescent lamp LA can be obtained, and turns on the TRIAC Q1 at a predetermined phase angle β near to the afore-mentioned phase angle based on the zero-cross sensing signal ZS. Thus, a current flows into the incandescent lamp LA through the TRIAC Q1, so that the incandescent lamp LA is previously heated. After reducing the inrush current of the incandescent lamp LA owing to the preheating, the CPU circuit 12 makes the transition to a normal control corresponding to the normal operation "C" (S5).

In the normal operation "C", the CPU circuit 12 outputs a voltage of a control signal to the IGBT Q4 through the D/A converting circuit 13 with basing on the zero-cross sensing signal ZS at a phase angle at which the illuminance ratio of the incandescent lamp LA can be obtained. In such the driving, a load voltage applied between both terminals of the incandescent lamp LA through the IGBT Q4 and the diode bridge DB is smoothly risen up along a curve L1 illustrated in FIG. 5A.

A driving term of the IGBT Q4 including the rising up term (a term designated By a symbol "a" in FIGS. 3A and 3C) starts before the turning on of the TRIAC Q1, and completes after the IGBT Q4 is perfectly turned on (saturated state) and after the transition to a term for turning on the TRIAC Q1 by applying a pulse trigger signal to the gate of the TRIAC Q1 through the driving circuit 14 (a term designated by a symbol "b" in FIGS. 3A and 3C).

The term, while the TRIAC Q1 is turned on, is continued near to the zero-cross point of the AC voltage at which a value of the current flowing in the TRIAC Q1 becomes equal to or smaller than a value of a holding current thereof. By repeating the sequential motion in each half cycle of the commercial power source AC, a phase controlled electric power is supplied to the incandescent lamp LA, so that the incandescent lamp LA is controlled to be the predetermined illuminance ratio set in the external input device 2.

Hereupon, it is possible to control the IGBT Q4 serving as the second switching device gradually for increasing the load voltage applied to the incandescent lamp LA in the current sensing term "A". Thus, it is possible to prevent to flush the current into the IGBT Q4, and surely to sense the occurrence of the short circuit current or the excessive inrush current before reaching the critical current, so that the switching device can be protected from the damage.

In a driving term of the IGBT Q4, the CPU circuit 12 generates control signals for driving the IGBT Q4 in a manner so that the load voltage applied to the incandescent lamp LA is fluently varied following a predetermined pattern.

A method for controlling the voltage applied to the incandescent lamp LA is described with reference to an example that a voltage between both terminals of the IGBT Q4 is varied corresponding to the voltage of the control signal applied to the gate of the IGBT Q4. The CPU circuit 12 divides the driving term of the IGBT Q4 into a plurality of sections, and generates a digital control signal corresponding to the voltage of the control signal applied to the gate of the IGBT Q4 in each section. The digital control signals generated in timeline are converted to an analogous voltage of control signal by the D/A converting circuit 13, and the analogous voltage of the control signal is applied to the gate of the IGBT Q4. The IGBT Q4 is driven by application of the analogous voltage of the control signal so that the load voltage in the startup term is linearly increased along a line L2 or nonlinearly along a curve L1 illustrated in FIG. 5A.

Figure 6A:
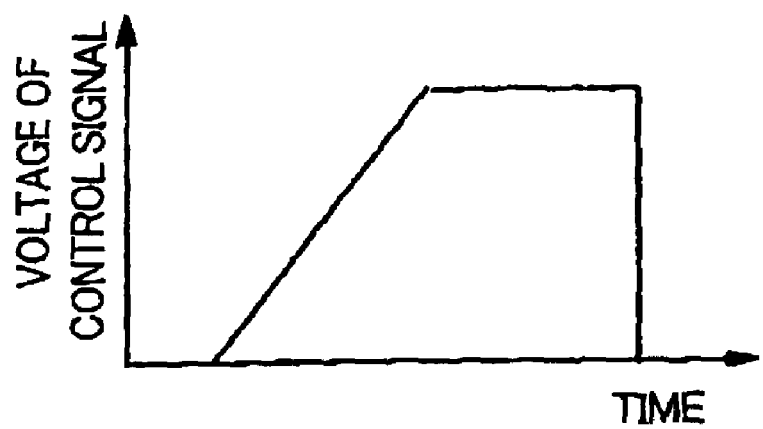
FIG. 6A is a waveform chart showing an example of a voltage of a control signal applied to the IGBT in the first embodiment.
Figure 6B:
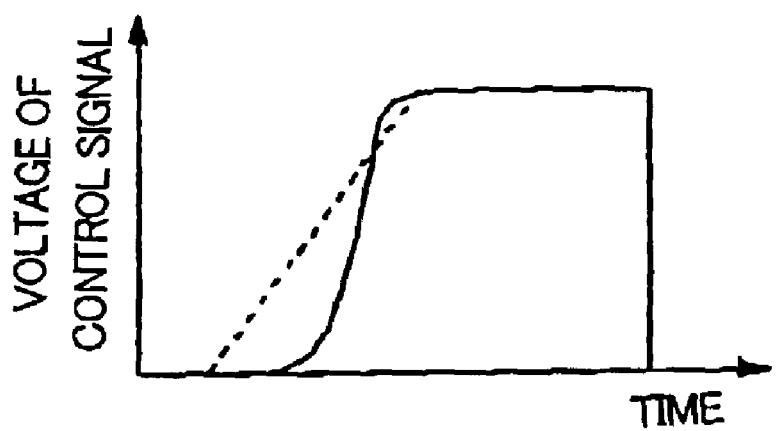
FIG. 6B is a waveform chart showing another example of a voltage of a control signal applied to the IGBT in the first embodiment.

FIG. 6A shows an example of the variation pattern of the voltage of the control signal applied to the gate of the IGBT Q4 linearly for increasing the load voltage. FIG. 6B shows another example of the variation pattern of the voltage of the control signal applied to the gate of the IGBT Q4 nonlinearly for increasing the load voltage.

Figure 5A:
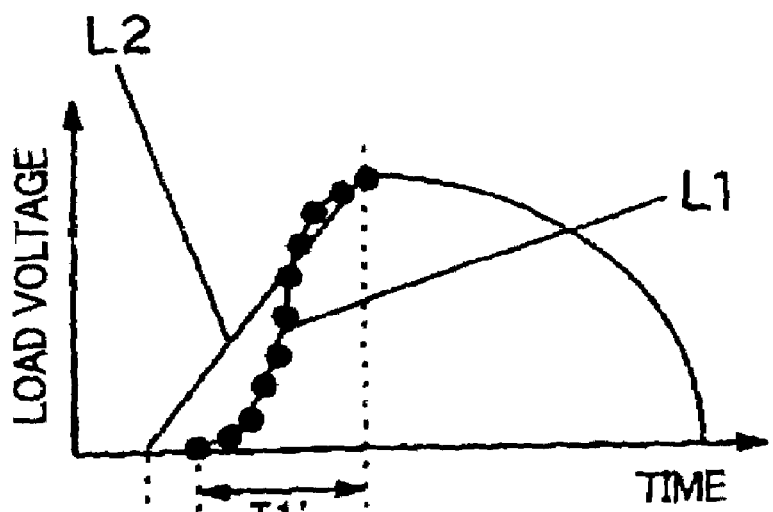
FIG. 5A is a waveform chart showing a variation of a voltage of a load while the phase control in the first embodiment.
Figure 5B:
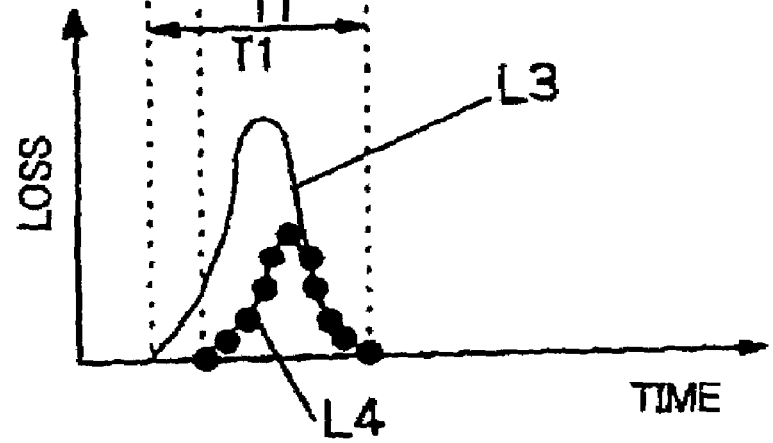
FIG. 5B is a waveform chart showing a variation of dissipation due to the IGBT while the phase control in the first embodiment.

In FIG. 5B, a curve L3 designates a switching loss when the load voltage is increased along the line L2, and a curve L4 designates a switching loss when the load voltage is increased along the curve L1, illustrated in FIG. 5A. In comparison with the curves L3 and L4, it is found that the shorter the term for increasing the load voltage is, the smaller the switching loss and heat quantity become.

As shown in FIG. 3B, the value of the current $I_{input}$ sensed in the shunt resistor R6 surpasses the value of the short circuit current $I_{max1}$ over several cycles in the current sensing term "A", the CPU circuit 12 stops the phase control, and makes the transition to stop mode (S6). It is possible to provide an alarm for announcing the emergency stop of the phase control.

When the value of the current $I_{input}$ surpasses the value of the critical current $I_{max}$ in each half cycle in the current sensing term "A", the CPU circuit 12 judges the short circuit occurs, and executes a process for making the transition to the stop mode. At this time, a time delay for shutting off the IGBT Q4 is previously included in the value of the critical current $I_{max}$ as a tolerance.

On the other hand, when a load capacity of the incandescent lamp LA is smaller, the value of the current $I_{input}$ is smaller than the value of the inrush current $I_{max2}$ in the current sensing term "A". Thus, as shown in FIG. 3C, the CPU circuit 12 executes the normal operation "C" just after completing the current sensing term "A" (S7).

Since the phase controller 1A in accordance with the first embodiment sets the current sensing term "A" for sensing the current flowing in the IGBT Q4 in the startup of the phase control, it is possible to prevent the short circuit of the load or the damage of the switching device due to the excessive inrush current. The phase controller 1A further executes a waveform-control temporally divided by the IGBT Q4 in the normal operation, so that the occurrence of the noise can be reduced.

A first modification of the first embodiment is described with reference to FIGS. 7A and 7B. As shown in FIG. 7A, when the IGBT Q4 is turned on at a phase angle near to 90 degrees where the voltage of the commercial power source AC is higher in the current sensing term "A", the value of the inrush current or the shirt circuited current flowing in the IGBT Q4 at the time reaches to the value of the critical current $I_{max}$. Thus, the IGBT Q4 may be damaged due to brief turning on of the IGBT Q4 for sensing the current.

For preventing the damage of the IGBT Q4, it is preferable to turn on the IGBT Q4 at a low phase angle α near to the zero-cross point of the AC voltage in the current sensing term "A", as shown in FIG. 7B. Thus, it is possible to reduce the level of the inrush current or the short circuit current flowing in the IGBT Q4 while the brief turning on to a level Is by which the IGBT Q4 may not be damaged. In a low phase angle region near to the zero-cross point of the AC voltage, a relative ratio of the value of the actual inrush current with respect to the reference voltage becomes higher, so that it is possible surely to prevent the damage of the IGBT Q4 in the current sensing operation.

Figure 8A:
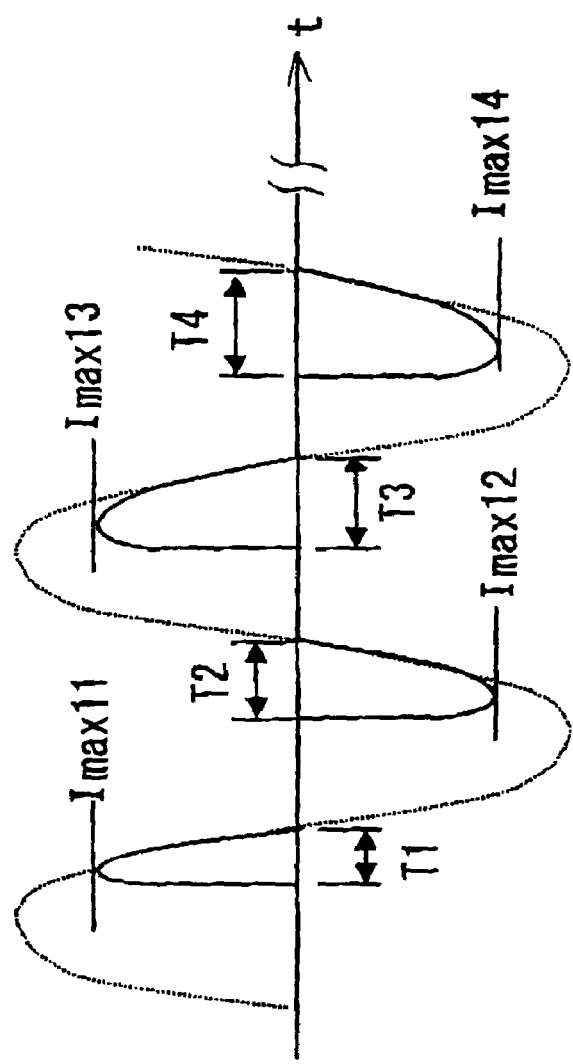
FIG. 8A is a waveform chart showing phase angles at which an IGBT is turned on in a preheating term in a second modification of the first embodiment.

A second modification of the first embodiment is described with reference to FIGS. 8A and 8B. FIG. 8A shows enlarged waveform in the preheating term "B" in FIG. 8B. In the second modification, turning on term of the TRIAC Q1 in the preheating term "B" is gradually elongated. In FIG. 8A, symbols $I_{max11}$, $I_{max12}$, $I_{max13}$ and $I_{max14}$ respectively designate peak values of the current flowing in the incandescent lamp LA in the turning on terms T1, T2, T3 and T4.

Figure 8B:
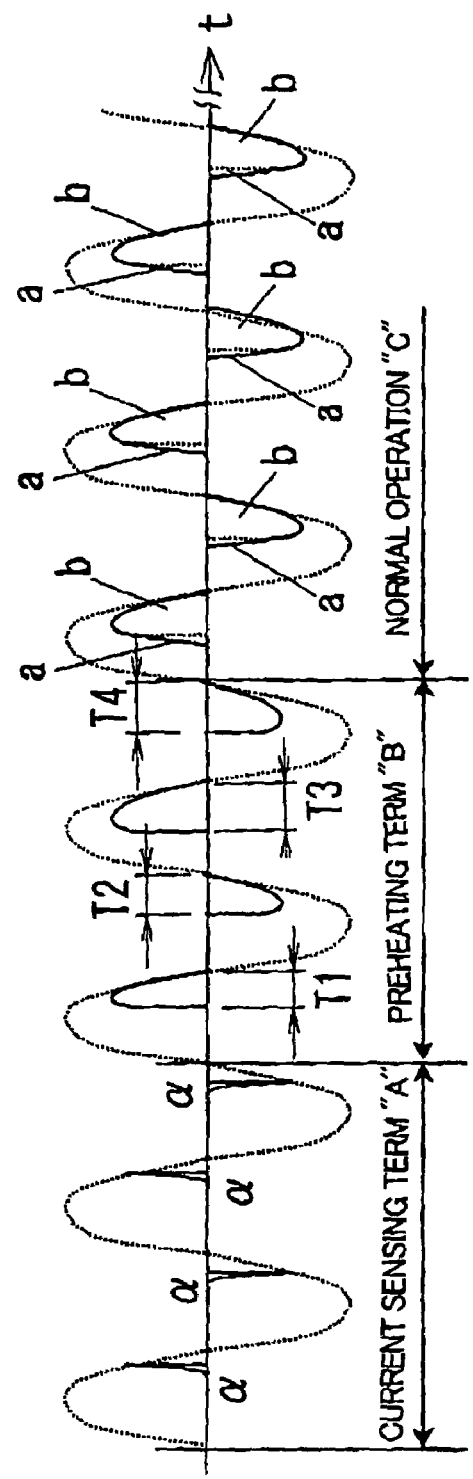
FIG. 8B is a waveform chart showing variation of phase angles at which the IGBT is turned on when an excessive inrush current is sensed in the second modification in the first embodiment.

As shown in FIGS. 8A and 8B, the turning on terms T1, T2, T3 and T4 . . . of the TRIAC Q1 in each half cycle is gradually elongated from the start to the completion of the preheating term "B" so as to approach to the phase angle corresponding to the illuminance ratio set in the external input device 2, finally. Thus, it is possible to reduce the value of the inrush current at a phase angle near to the set angle corresponding to the phase control in the normal operation "C". When the set phase angle is near to 90 degrees, it is possible to reduce the occurrence of the noise.

Since the preheating term "B" before the transition to the normal operation "C" is several cycles (for example, two cycles in FIG. 8B), the user rarely aware the term necessary for varying the illuminance of the incandescent lamp LA to the set value. Thus, the user can operate the phase controller 1A to control the illuminance of the incandescent lamp LA without uncomfortable.

Figure 9:
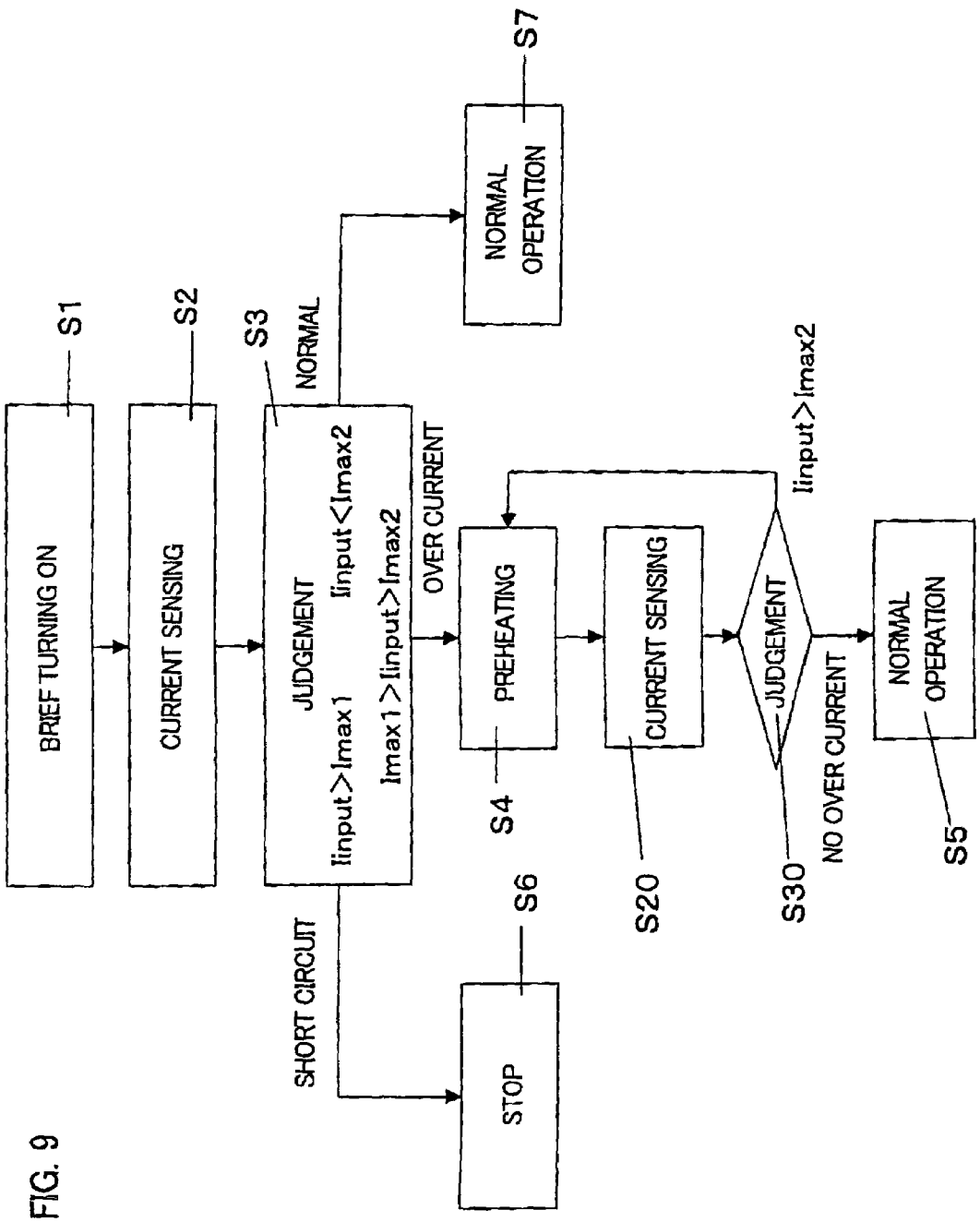
FIG. 9 is a flowchart showing an operation of the phase controller in a third modification of the first embodiment.

A third modification of the first embodiment is described with reference to FIGS. 9, 10A and 10B. The motion of the CPU circuit 12 is described with reference to a flowchart shown in FIG. 9. Description of common steps in the flowchart shown in FIG. 4 is omitted.

Figure 4:
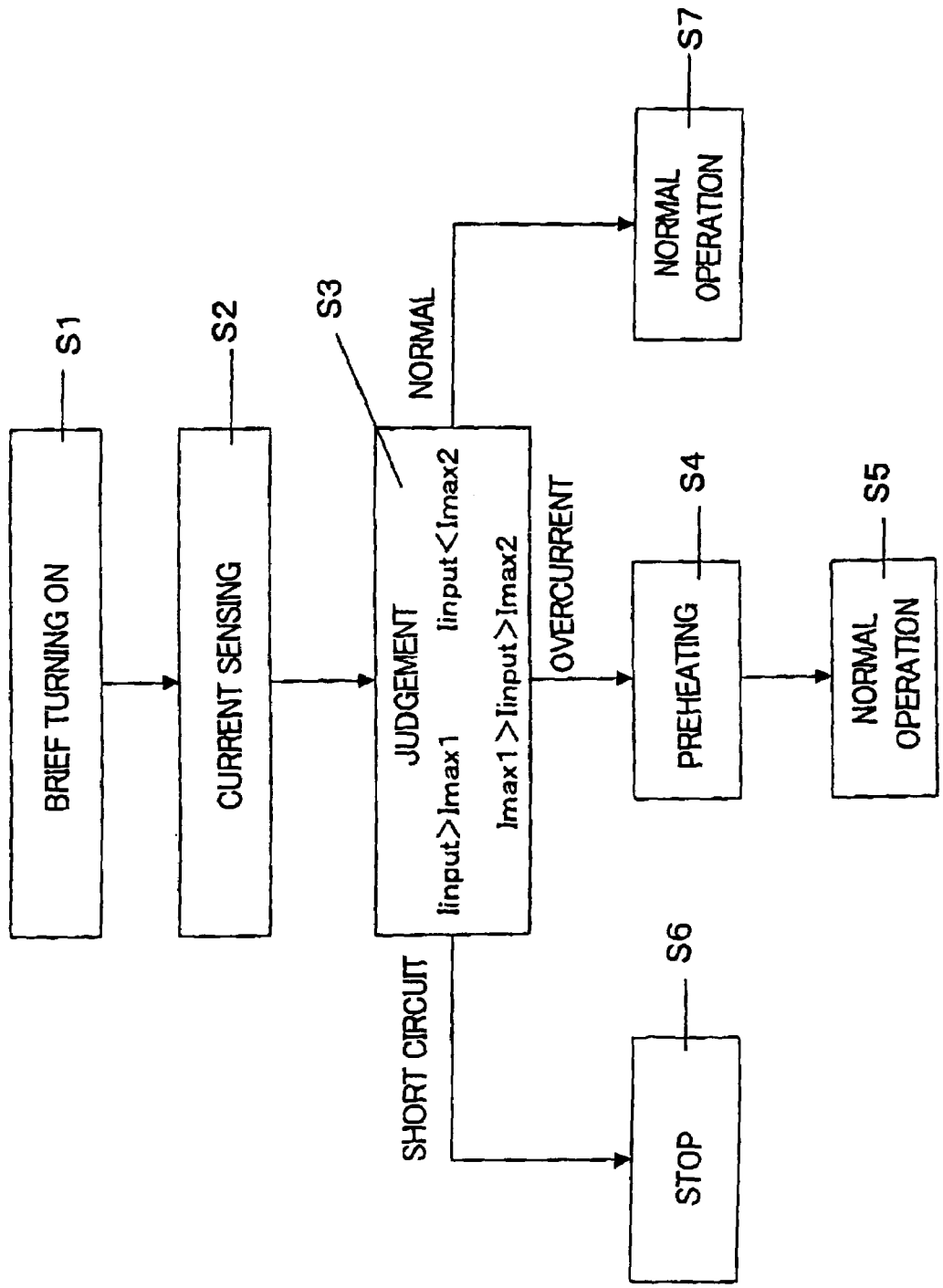
FIG. 4 is a flowchart showing an operation of the phase controller in the first embodiment.

In the step S3, when the value of the current $I_{input}$ sensed in the shunt resistor R6 is smaller than the value of the critical current $I_{max}$ but larger than the value of the inrush current $I_{max2}$, the preheating term "B" is set in the step S4 similar to the case shown in FIG. 4. After completing the preheating term "B", the CPU 12 further sets the current sensing term "A" again, and executes over current sensing while the IGBT Q4 is briefly turned on in the current sensing term "A" (S20). Subsequently, the CPU circuit 12 judges whether the voltage between both terminals of the shunt resistor R6 corresponding to the value of the current $I_{input}$ flowing in the shunt resistor R6 while the IGBT Q4 is turned on is smaller than a reference voltage corresponding to the value of the critical current $I_{max}$ and larger than another reference voltage corresponding to the value of the inrush current $I_{max2}$, or not (S30).

In the judgment in the step S30, when the voltage between the both terminals of the shunt resistor R6 corresponding to the value of the input current $I_{input}$ is equal to or smaller than the reference voltage corresponding to the value of the inrush current $I_{max2}$, the CPU circuit 12 executes the normal operation as shown in FIG. 10A in the step S5. Alternatively, when the voltage between the both terminals of the shunt resistor R6 corresponding to the value of the input current $I_{input}$ is larger than the reference voltage corresponding to the value of the inrush current $I_{max2}$, the CPU circuit 12 returns to the step S4 and sets the preheating term "B" again, as shown in FIG. 10B. The CPU circuit 12 repeats the serial steps S4, S20 and S30 until the voltage between the both terminals of the shunt resistor R6 corresponding to the value of the $I_{input}$ current input becomes equal to or smaller than the reference voltage corresponding to the value of the inrush current $I_{max2}$.

Since the preheating term "B" and the current sensing term "A" are repeatedly set while the inrush current is judged excessive, and the transition to the normal operation "C" is made after judging the inrush current is not excessive, the devices such as the IGBT Q4 and so on and the circuit can surely be protected from the damage due to excessive inrush current. When the time length of the reconfigured preheating term "B" is selected corresponding to the value of the input current $I_{input}$ sensed in the last current sensing term "A", the transition to the normal operation "C" can be executed in a short time.

In case that the wiring from the incandescent lamp LA to the phase controller 1A is too long, the impedance of the wiring becomes much larger, so that the value of the input current $I_{input}$ due to the short circuit current becomes same level as the value of the input current $I_{input}$ due to the inrush current. Thus, it is preferable that a memory device such as a flash memory (not shown) is provided in the CPU circuit 12 for memorizing the value of the input current $I_{input}$ sensed in the current sensing operation. The values of the input current $I_{input}$ memorized in the memory device can be used for distinguishing the short circuit current from the inrush current.

The CPU circuit 12 briefly turns on the IGBT Q4 at a predetermined phase angle α in the current sensing term "A", and compares the voltage between the both terminals of the shunt resistor R6 due to the current flowing in the grief turn on of the IGBT Q4 with a predetermined reference voltage. Thus, the CPU circuit 12 can judge whether an excessive current larger than the inrush current is flowing or not, or a short circuit current is flowing or not. The CPU circuit 12 memorizes the value of the input current $I_{input}$ into the memory device, and further compares the value of the input current $I_{input}$ sensed in this current sensing operation with the value of the input current $I_{input}$ sensed in the last current sensing operation. The CPU circuit 12 repeats the current sensing and the comparison with the values of the input currents $I_{input}$. When the values of the input currents $I_{input}$ are varied, but the differences between the values are gradually reduced, the CPU circuit 12 judges that the input current $I_{input}$ is due to the inrush current of the incandescent lamp LA which is gradually reduced owing to effect of the preheating. When there in no difference between the values of the input currents $I_{input}$, the CPU circuit 12 judges that the input current $I_{input}$ is due to the short circuit current in the load, and stops the phase control, immediately. Thus, even though the input current $I_{input}$ is judged due to the excessive inrush current in the judgment using the reference voltage, the input current $I_{input}$ is finally judged due to the short circuit current, so that the damage of the devices can be prevented.

In the first current sensing, there is no value of the input current $I_{input}$ memorized in the memory device, so that the judgment whether the inrush current or the short circuit current is not executed.

Figure 11:
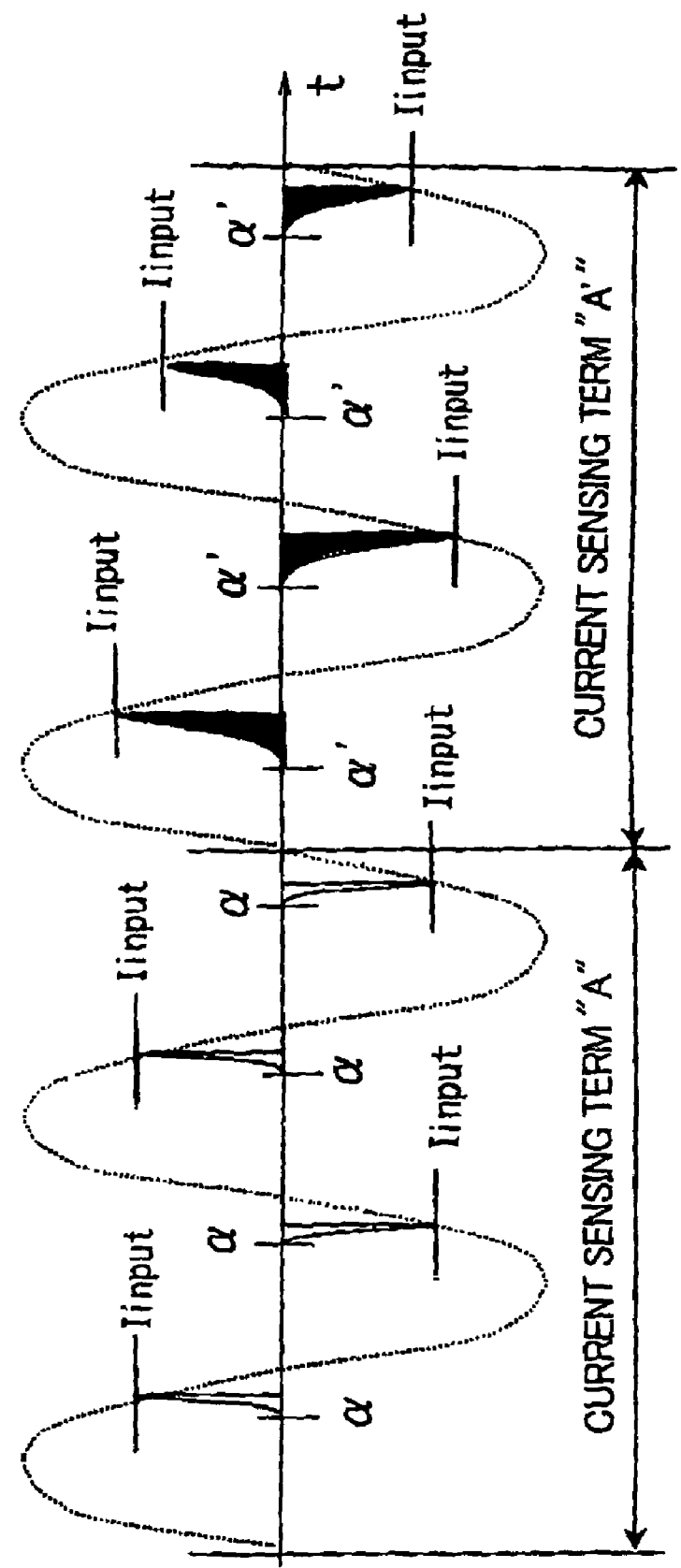
FIG. 11 is a waveform chart showing variation of phase angles in current sensing terms in a fourth modification of the first embodiment.

A fourth modification of the first embodiment is described with reference to FIGS. 11 to 14. When the value of the input current $I_{input}$ sensed in the current sensing term "A" is smaller, as shown in FIG. 11, it is preferable to set a modified current sensing term "A'" after completing the normal current sensing term "A". In the modified current sensing term "A'", the phase angle α at which the IGBT Q4 is turned on is renewed to another phase angle α' so as to elongate the turning on term of the IGBT Q4 becomes longer, and the preheating effect of the incandescent lamp LA is improved. By setting the modified current sensing term "A'", the value of the input current $I_{input}$ becomes larger, so that the inrush current can surely be distinguished from the short circuit current. The phase angle β at which the TRIAC Q1 is turned on can be set in a region to the largest admissible current value of the IGBT Q4.

Figure 12:
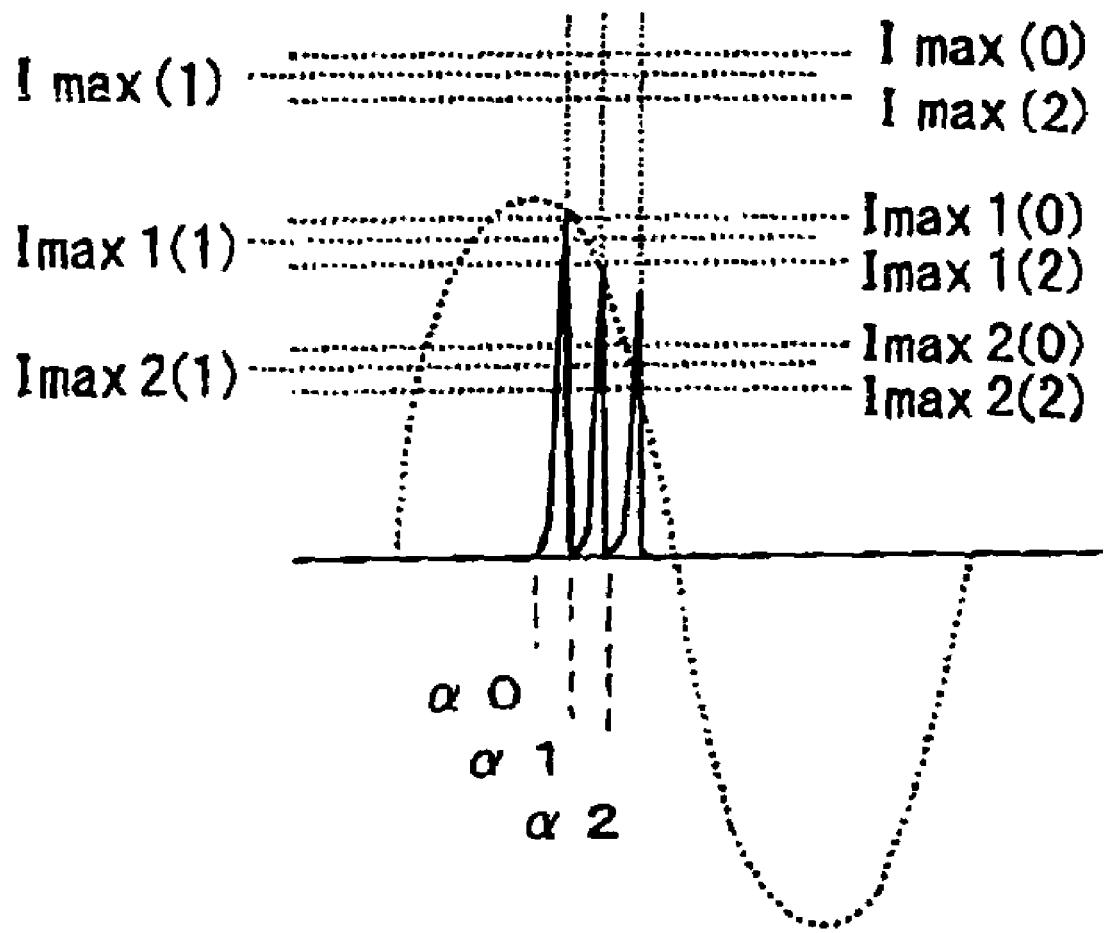
FIG. 12 is a waveform chart showing relations of phase angle with respect to a critical current value, a short circuit current value and an inrush current value in a brief turning on of the IGBT in the fourth modification of the first embodiment.

It is further preferable that a plurality of the phase angles α (i) for driving the IGBT Q4 in the current sensing term "A" is set so as to distinguish the excessive inrush current from the short circuit current. Values of the critical current $I_{max}(i)$ the short circuit current $I_{max1}(i)$ and the inrush current $I_{max2}(i)$ are set with respect to each phase angle α (i). As an example, the values of the critical currents $I_{max}(0)$ to $I_{max}(2)$, the short circuit currents $I_{max1}(0)$ to $I_{max1}(2)$ and the inrush currents $I_{max2}(0)$ to $I_{max2}(2)$ with respect to three phase angles α (0), α (1) and α (2) are illustrated in FIG. 12.

Figure 13:
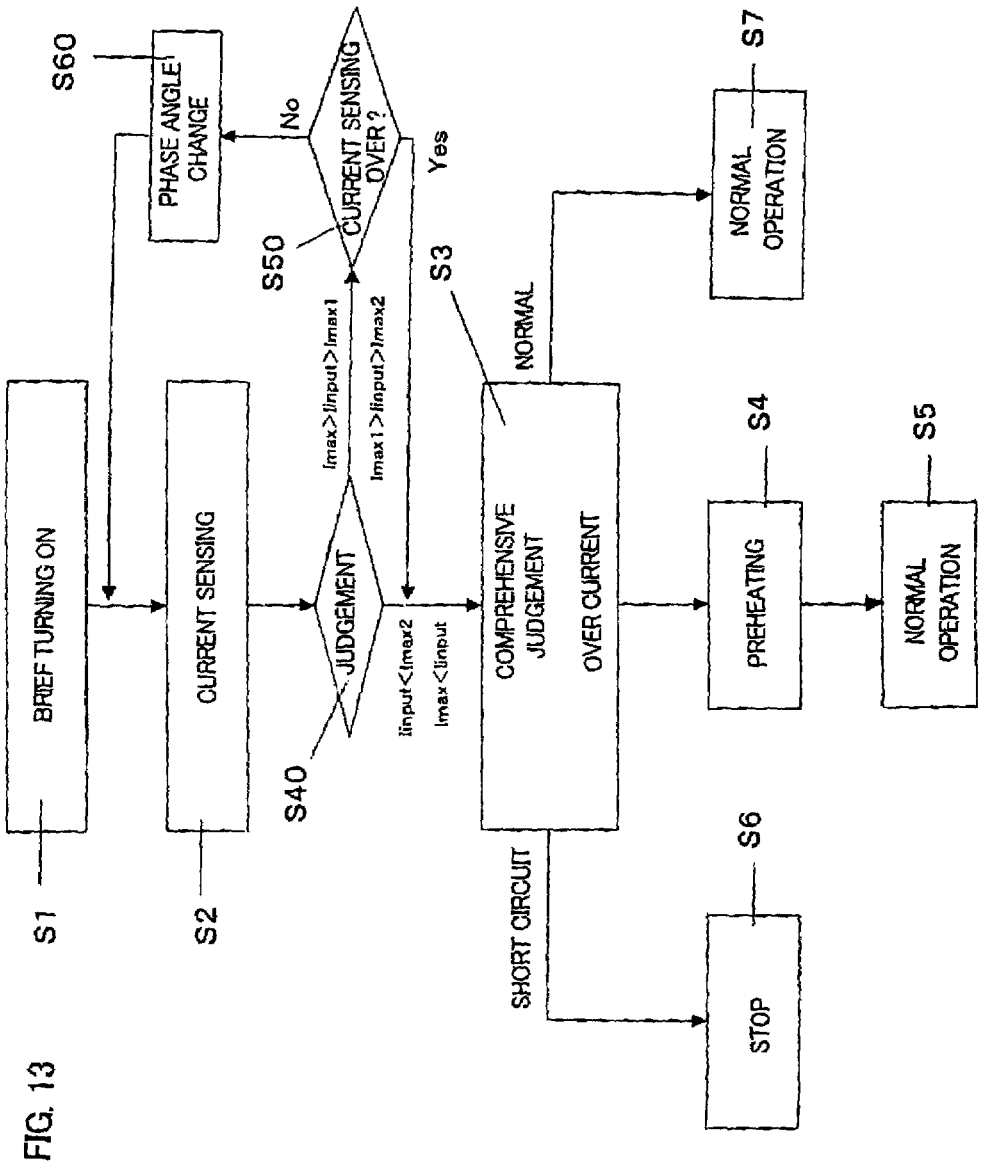
FIG. 13 is a flowchart showing an operation of the phase controller in the fourth modification of the first embodiment.

The motion of the CPU circuit 12 is described with reference to a flowchart shown in FIG. 13.

When the current sensing term "A" starts (S1), the CPU circuit 12 starts to sense the over current (S2), and the IGBT Q4 is briefly turned on at the phase angle α (0). Subsequently, the CPU circuit 12 compares the value of the input current input sensed as a voltage between the shunt resistor R6 with the values of the critical current $I_{max}(0)$, the short circuit current $I_{max1}(0)$ and the inrush current $I_{max2}(0)$ (S40).

When the CPU circuit 12 judges $I_{max}(0) > I_{input} > I_{max1}(0)$ and $I_{max1}(0) > I_{input} > I_{max2}(0)$ in the step S40, the CPU circuit 12 further judges whether the current sensing term "A" has been completed or not (S50). When the current sensing term "A" has not been completed, the CPU circuit 12 executes a process for renewing the phase angle for driving the IGBT Q4 from α (0) to α (1) in the next half cycle (S60), and returns to the step S2.

Figure 14:
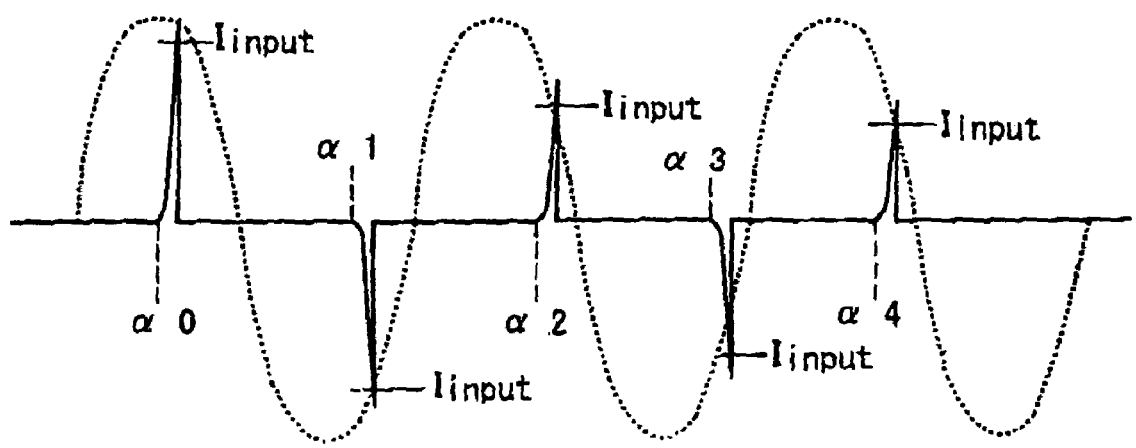
FIG. 14 is a waveform chart showing variation of phase angles at which the IGBT is turned on in a current sensing term in the fourth modification of the first embodiment.

In the step S2, the CPU circuit 12 briefly turns on the IGBT Q4 at the phase angle α (1). When the CPU circuit 12 judges $I_{max}(1) > I_{input} > I_{max1}(1)$ and $I_{max1}(1) > I_{input} > I_{max2}(1)$ in the step S40, the CPU circuit 12 executes the process for renewing the phase angle for driving the IGBT Q4 from α (1) to α (2) in the next half cycle in the step S60. In cease that the phase angles are set more than four, the phase angle α (i) is serially renewed in the same manner. FIG. 14 shows that the phase angle α (i) at which the IGBT Q4 is briefly turned on are renewed in the current sensing term "A".

When the current sensing term "A" has been completed (YES in the step S50), the CPU circuit 12 judged whether the inrush current is excessive or not, or whether the short circuit current flows or not with reference to the counts of the judgments in the comprehensive judgment process in the step S3. In the step S3, the CPU circuit 12 counts a number of judgment results $I_{input} > I_{max1}(i)$, a number of judgment results $I_{max1}(i) > I_{input} > I_{max2}(i)$, and a number of judgment results $I_{input} > I_{max2}(i)$. When the CPU circuit 12 judges that the short circuit current is sensed, the CPU circuit 12 immediately stops the phase control and makes the transition to the stop mode (S6). On the other hand, when the CPU circuit 12 judges the inrush current is excessive, the CPU circuit 12 executes the process for setting the preheating term "B" similar to the case in the flowchart shown in FIG. 4(S4). After completing the preheating term "B", the CPU circuit 12 makes the transition to the normal operation "C" (S5).

When the CPU circuit 12 judges $I_{input} < I_{max2}(0)$ in the step S3, the CPU circuit 12 immediately makes the transition to the normal operation (S7). Furthermore, when the CPU circuit 12 judges $I_{input} > I_{max}(0)$, the CPU circuit 12 immediately stops the phase control. In the synthetic judgment in the step S3, it is possible to adopt the judgment result having the largest number, as the result of the synthetic judgment.

Second Embodiment

Figure 15:
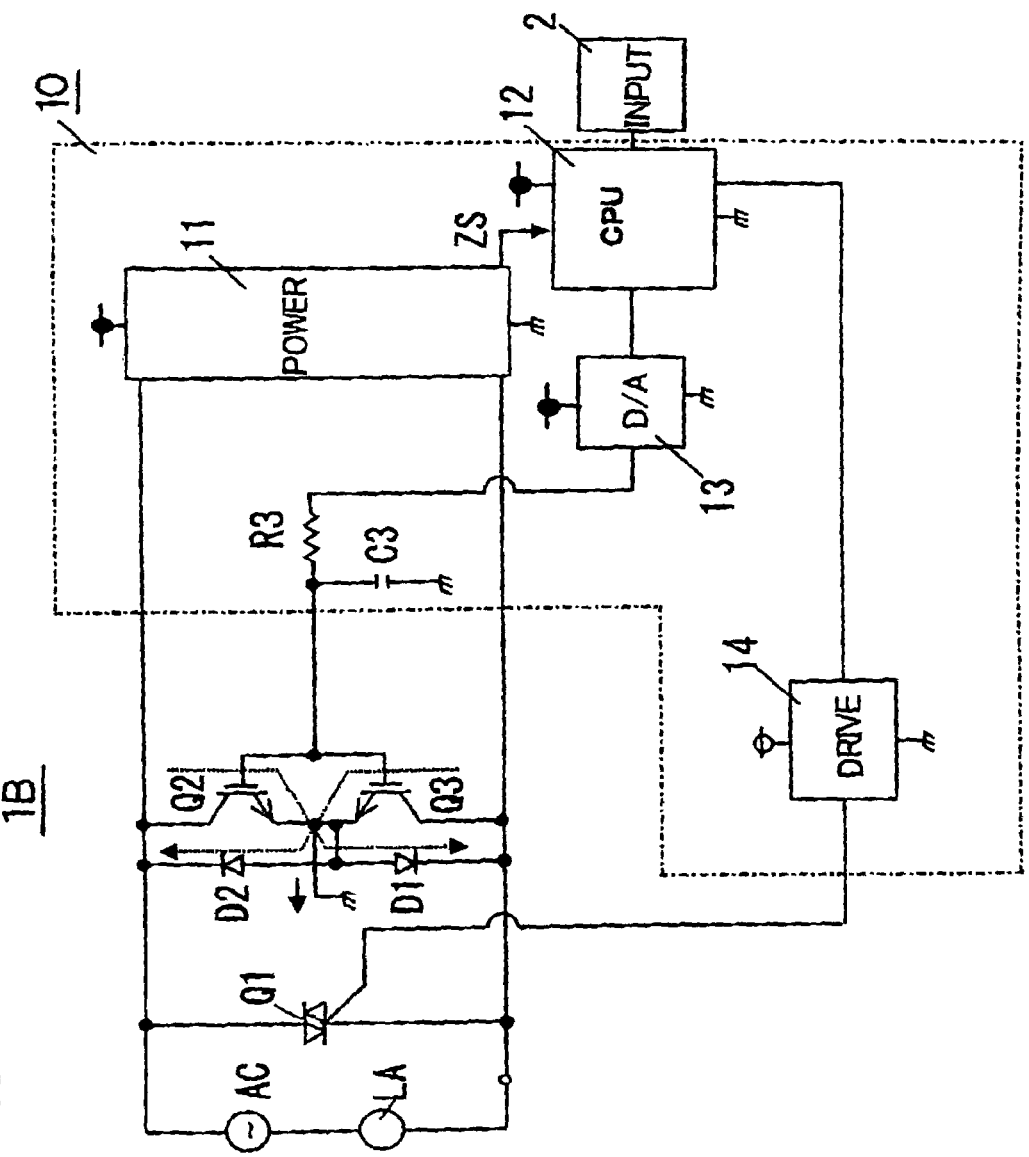
FIG. 15 is a circuit diagram showing a configuration of a phase controller in accordance with a second embodiment of the present invention.

A phase controller 1B in accordance with a second embodiment of the present invention is described with reference to FIG. 15.

The phase controller 1B comprises a TRIAC Q1 serving as a first switching device, an IGBT Q2 serving as a self-quenching type second switching device, an IGBT Q3 serving as a self-quenching type third switching device, a first diode D1, a second diode D2, a control circuit 10 for controlling the TRIAC Q1, the IGBT Q2 and the IGBT Q3, and an external input device 2. The IGBT Q2 and the IGBT Q3 are connected in series between both terminals of the TRIAC Q1 in a manner so that turning on direction of the IGBT Q2 is opposite to that of the IGBT Q3. The first diode D1 is connected back-to-back with the terminals of the IGBT Q3 serving as the third switching device. The second diode D2 is connected back-to-back with the terminals of the IGBT Q2 serving as the second switching device. Hereupon, the back-to-back connection is defined that the directions of the currents flowing in the diode D1 and D2 are opposite to the directions of the currents flowing the IGBT Q3 and the IGBT Q2. The IGBT Q2. The IGBT Q3, the first diode D1, the second diode D2, and so on serve as a load voltage increasing circuit gradually for increasing the load voltage applied to the incandescent lamp LA before turning on the TRIAC Q1 serving as the first switching device.

A collector of the IGBT Q2 is connected to a terminal of the TRIAC Q1, and an emitter thereof is grounded. A collector of the IGBT Q3 is connected to the other terminal of the TRIAC Q1, and an emitter thereof is grounded. A cathode of the second diode D2 is connected to the collector of the IGBT Q2, and an anode of the second diode D2 is connected to an emitter of the IGBT Q2. Similarly, a cathode of the first diode D1 is connected to a collector of the IGBT Q3, and an anode of the first diode D1 is connected to an emitter of the IGBT Q3. A gate of the IGBT Q2 and a gate of the IGBT Q3 are respectively connected to a D/A converting circuit 13 of the control circuit 10.

In case of using MOSFETs as the second and third switching devices, parasitic diodes of the MOSFETs can be used as the first and second diodes D1 and D2.

The control circuit 10 has substantially the same constitution as that of the phase controller 1A in accordance with the first embodiment, but different that the CPU circuit 12 controls the TRIAC Q1, the IGBT Q2 and the IGBT Q3.

Subsequently, the motion of the phase controller 1B in accordance with the second embodiment is described.

When the phase controller 1B is in a ready and standby mode of the phase control, a current flows from the commercial power source AC to the power circuit 11. The power circuit 11 senses the zero-cross point and inputs the zero-cross sensing signal ZS to the CPU circuit 12, further to supplying the electric power to the CPU circuit 12. The CPU circuit 12 calculates a position of the zero-cross point based on the zero-cross sensing signal ZS outputted from the power circuit 11.

When a switching on signal and a setting signal corresponding to the illuminance ratio set by a user are inputted from the external input device 2, the CPU circuit 12 calculates a phase angle at which the illuminance ratio of the incandescent lamp LA set in the external input device 2 can be obtained. Furthermore, the CPU circuit 12 outputs a voltage as a control signal for briefly turning on the IGBT Q2 and the IGBT Q3 based on the zero-cross sensing signal ZS at a predetermined phase angle α at each half cycle of the commercial power source AC.

In this motion, the load voltage between both terminals applied to the incandescent lamp LA through the IGBT Q2 and the first diode D1 or the IGBT Q3 and the second diode D2 is fluently increased along the line L1 ad shown in FIG. 5A. In other words, in a positive half cycle of the commercial power source AC during which the potential connected to the incandescent lamp LA becomes negative, the IGBT Q2 serving as the second switching device is driven for flowing the current in a closed circuit constituted by a series of the commercial power source AC, the IGBT Q2, the first diode D1 and the incandescent lamp LA. Alternatively, in a negative half cycle of the commercial power source AC during which the potential connected to the incandescent lamp LA becomes positive, the IGBT Q3 serving as the third switching device is driven for flowing the current in a closed circuit constituted by a series of the commercial power source AC, the incandescent lamp LA, the IGBT Q3, and the second diode D2. By such the driving, the load voltage applied to the incandescent lamp LA can fluently be increased by increasing the current flowing in the closed circuits gradually.

A driving term of the IGBT Q2 or the IGBT Q3 including the rising up term starts before the turning on of the TRIAC Q1, and completes after the IGBT Q2 or the IGBT Q3 is perfectly turned on (saturated state) and after the transition to a term for turning on the TRIAC Q1 by applying a pulse trigger signal to the gate of the TRIAC Q1 through the driving circuit 14.

The term while the TRIAC Q1 is turned on is continued near to the zero-cross point of the AC voltage at which a value of the current flowing in the TRIAC Q1 becomes equal to or smaller than a value of a holding current thereof. By repeating the sequential motion in each half cycle of the commercial power source AC, a phase controlled electric power is supplied to the incandescent lamp LA, so that the incandescent lamp LA is controlled to be the predetermined illuminance ratio set in the external input device 2.

In the driving terms of the IGBT Q2 and the IGBT Q3, the CPU circuit 12 generates control signals for driving the IGBT Q2 and the IGBT Q3 in a manner so that the load voltage applied to the incandescent lamp LA is fluently varied following a predetermined pattern. A method for controlling the voltage applied to the incandescent lamp LA is described with reference to an example that voltages between both terminals of the IGBT Q2 and the IGBT Q3 are varied corresponding to the voltages of the control signals applied to the gates of the IGBT Q2 and the IGBT Q3. The CPU circuit 12 divides the driving terms of the IGBT Q2 and the IGBT Q3 into a plurality of sections, and generates a digital control signal corresponding to the voltage of the control-signal applied to the gate of the IGBT Q2 or the IGBT Q3 in each section. The digital control signals generated in timeline are converted to an analogous voltage of control signal by the D/A converting circuit 13, and the analogous voltage of the control signal is applied to the gate of the IGBT Q2 or the IGBT Q3. The IGBT Q2 and the IGBT Q3 are driven by application of the analogous voltages of the control signals so that the load voltage in the startup term is linearly increased along a line L2 or nonlinearly along a curve L1 illustrated in FIG. 5A.

For increasing the load voltage applied to the incandescent lamp LA linearly, it is possible to apply a voltage of control signal having a variation pattern shown in FIG. 6A to the gate of the IGBT Q2 or the IGBT Q3. Alternatively, for increasing the load voltage applied to the incandescent lamp LA nonlinearly, it is possible to apply a voltage of control signal having a variation pattern shown in FIG. 6B to the gate of the IGBT Q2 or the IGBT Q3.

The phase controller 1B in accordance with the second embodiment sets a gradual increase term T1 before the turning on of the TRIAC Q1 (see FIG. 5A) while the load voltage applied to the incandescent lamp LA is fluently increased through the IGBT Q2 and the IGBT Q3 serving as the self-quenching type second and third switching devices. In the gradual increase term T1, the phase controller 1B drives the IGBT Q2 and the IGBT Q3 in the sections divided in timeline from a predetermined phase. After passing the gradual increase term T1, the TRIAC Q1 serving as the first switching device is turned on. Thus, it is possible to overheat the self-quenching type switches and to downsize the phase controller 1B as a result.

Figure 16A:
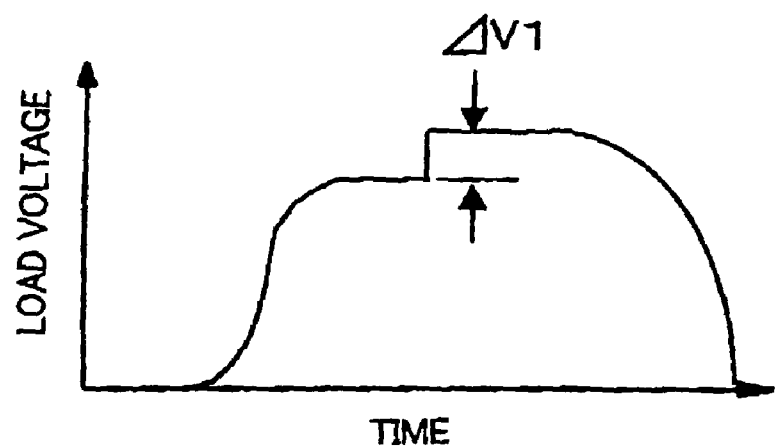
FIG. 16A is a waveform chart showing a voltage difference $\Delta V1$ between an ON voltage of the TRIAC and a sum of an ON voltage of the IGBT and ON voltages of two diodes in the phase controller in accordance with the first embodiment.

In the above-mentioned the phase controller 1A in accordance with the first embodiment shown in FIG. 1, the closed circuit, which is constituted when the IGBT Q4 is turned on, includes two diodes among the diode bridge DB. A voltage difference $\Delta$ V1 between an ON voltage of the TRIAC Q1 (1.3 to 1.4V) and a sum of an ON voltage of the IGBT Q4 (2 to 3V) and ON voltages of two diodes (0.7×2=1.4 V) becomes about 2 to 3 V (see FIG. 16A).

Figure 16B:
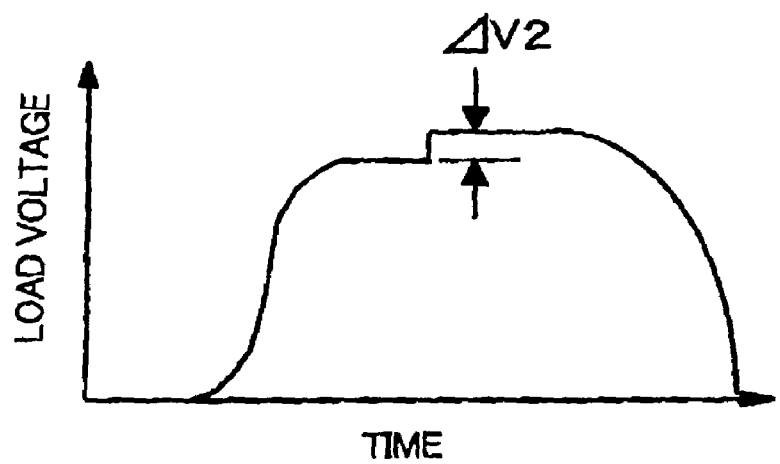
FIG. 16B is a waveform chart showing a voltage difference $\Delta V2$ between an ON voltage of the TRIAC and a sum of an ON voltage of the IGBT and an ON voltage of one diode in the phase controller in accordance with the second embodiment.

On the other hand, in the phase controller 1B in accordance with the second embodiment, the closed circuit, which is constituted when the IGBT Q2 serving as the second switching device is turned on, includes only the first diode D1. Similarly, the closed circuit, which is constituted when the IGBT Q3 serving as the third switching device is turned on, includes only the first diode D2. Thus, a voltage difference $\Delta$ V2 between an ON voltage of the TRIAC Q1 and a sum of an ON voltage of the IGBT Q2 or the IGBT Q3 and an ON voltage of one diode becomes about 1.3 to 2.3 V (see FIG. 16B). The voltage difference $\Delta$ V2 in the phase controller 1B can be made smaller about 0.7 V due to the voltage drop of one diode than the voltage difference $\Delta$ V1 in the phase controller 1A.

Since the phase controller 1B in accordance with the second embodiment needs two self-quenching type switching devices, the circuit configuration becomes a little complex than that of the phase controller 1A in accordance with the first embodiment. The phase controller 1B, however, has an advantageous that the voltage difference $\Delta$ V occurs when the TRIAC Q1 serving as the first switching device is turned on after passing the gradual increase term T1 becomes smaller. Thus, the occurrence of the high frequency noise can be reduced, even when the capacity of the incandescent lamp LA is larger.

Instead of using the D/A converting circuit 13, it is possible to generate PWM (pulse width modulation) signal in the CPU circuit 12 of the control circuit 10, which are applied to the gates of the IGBT Q2 and the IGBT Q3 so as to charge capacitors in the gates. Thus, the voltages of the control signals are varied corresponding to the variation of the charge stored in the capacitors. Furthermore, it is possible to add CR circuits for applying the voltages of the control signals to the gates of the IGBT Q2 and the IGBT Q3 further to the capacitance in the gates.

Furthermore, it is possible further to use a power source, which is controlled by the control circuit 10, for applying output current thereof to the gate of the IGBT Q2 or the IGBT Q3, directly. When the output current of the power source is controlled in each section divided the driving term of the IGBT Q2 or the IGBT Q3, a quantity of the charge in the capacitor C3 via the resistor R3 is controlled. Since the IGBT Q2 and the IGBT Q3 are driven corresponding to the quantity of the charge in the capacitors in the gates, it is possible precisely to control the waveform of the pattern of the variation of the increase of the load voltage applied to the incandescent lamp owing to the control of the quantity of the charge in the capacitor R3.

Third Embodiment

Figure 17:
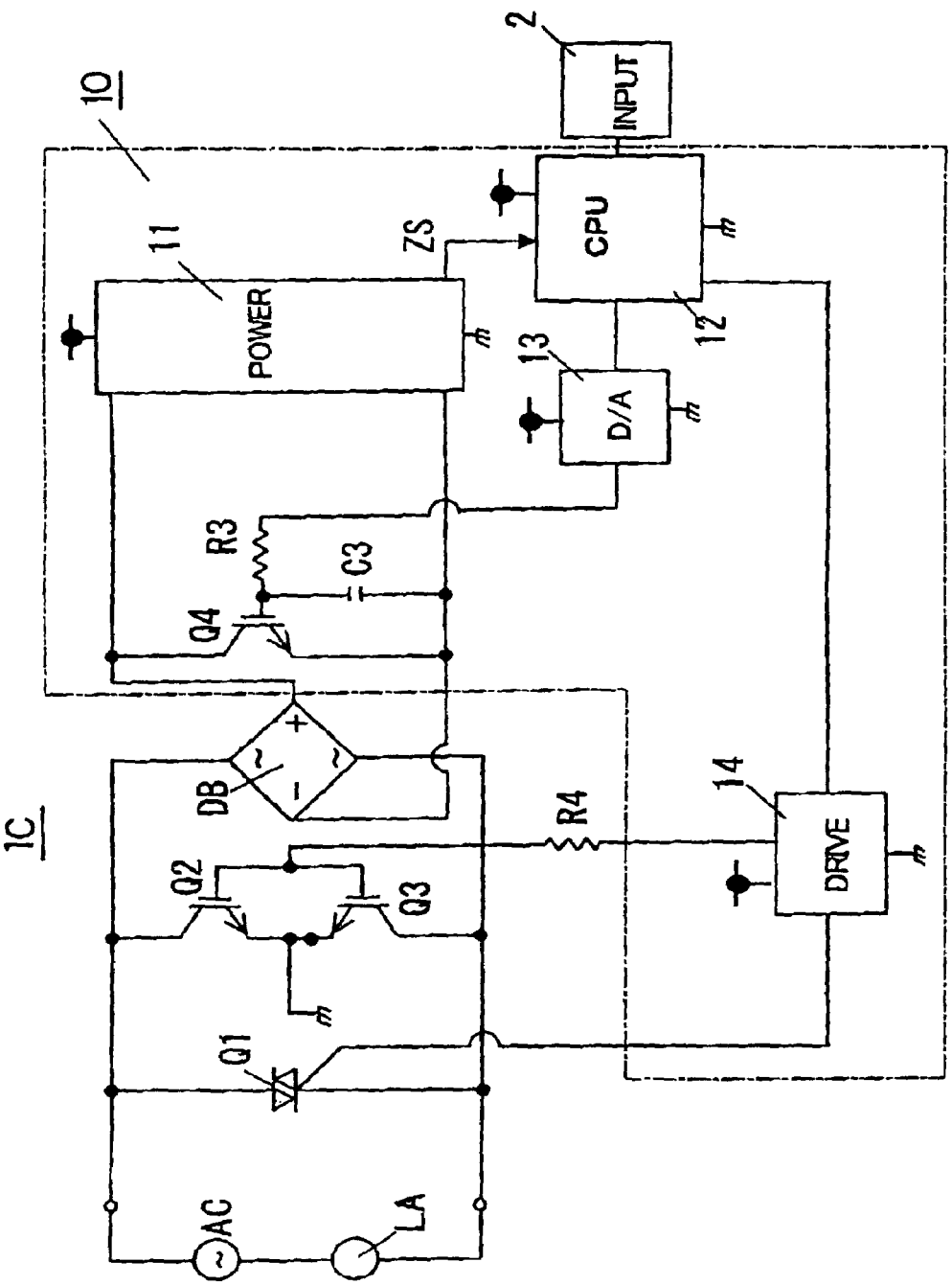
FIG. 17 is a circuit diagram showing a configuration of a phase controller in accordance with a third embodiment of the present invention.

A phase controller 1C in accordance with a third embodiment of the present invention is described with reference to FIG. 17.

The phase controller 1C comprises a TRIAC Q1 serving as a first switching device, an IGBT Q4 serving as a fourth self-quenching type switching device connected between both terminals of the TRIAC Q1 via a diode bridge DB, an IGBT Q2 serving as a self-quenching type second switching device, an IGBT Q3 serving as a self-quenching type third switching device, a control circuit 10 for controlling the TRIAC Q1, the IGBT Q2, the IGBT Q3 and the IGBT Q4, and an external input device 2. The IGBT Q2 and the IGBT Q3 are connected in series between both terminals of the TRIAC Q1 in a manner so that turning on direction of the IGBT Q2 is opposite to that of the IGBT Q3. A gate of the IGBT Q2 and a gate of the IGBT Q3 are respectively connected to a D/A converting circuit 13 of the control circuit 10 via a resistor R4. The IGBT Q2, the IGBT Q3, the IGBT Q4, the diode bridge DB, and so on serve as a load voltage increasing circuit gradually for increasing the load voltage applied to the incandescent lamp LA before turning on the TRIAC Q1 serving as the first switching device.

Subsequently, the motions of the phase controller 1C in accordance with the third embodiment are described. The motions in the standby mode during which the phase control is off and in the gradual increase term T1, however, are substantially the same as those in the above-mentioned phase controller 1A in accordance with the first embodiment. Thus, the description of them is omitted.

Figure 18A:
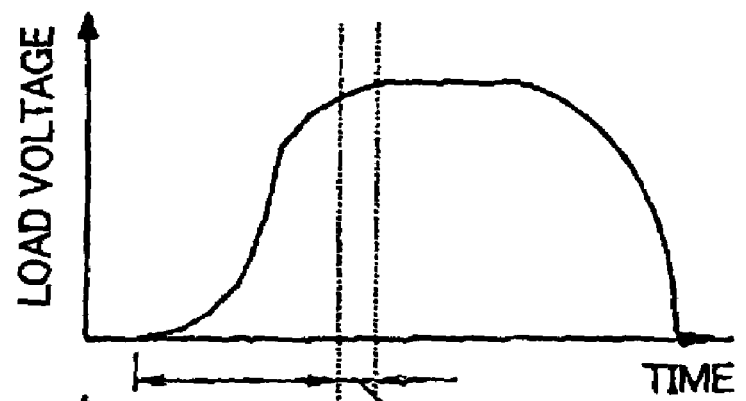
FIG. 18A is a waveform chart showing a load current flowing in a candescent lamp in the third embodiment.
Figure 18B:
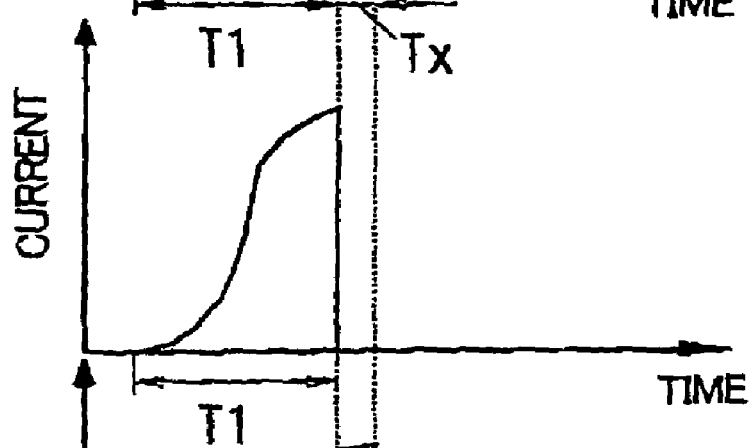
FIG. 18B is a waveform chart showing a current flowing in a fourth switching device in a gradual increase term in the third embodiment.
Figure 18C:
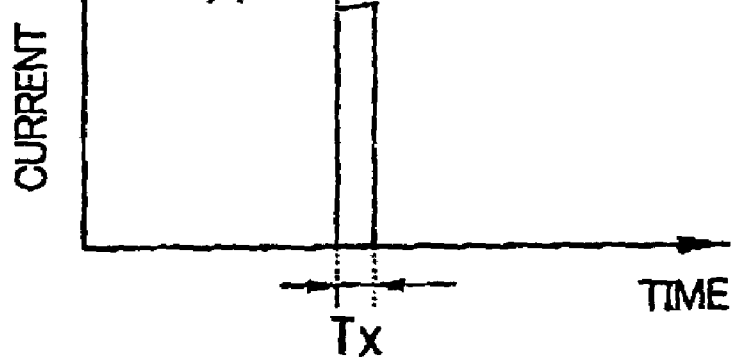
FIG. 18C is a waveform showing a current flowing in alternative of a second switching device or a third switching device in the third embodiment.

FIG. 18A shows a waveform of the load current flowing in the candescent lamp LA. FIG. 18B shows a waveform of a current flowing in the IGBT Q4 serving as the fourth switching device. FIG. 18C shows a waveform of a current flowing the IGBT Q2 serving as the second switching device or the IGBT Q3 serving as the third switching device.

As shown in FIGS. 18A to 18C, the CPU circuit 12 of the control circuit 10 supplies a pulse signal to the gate of the IGBT Q2 in the positive half cycle of the commercial power source AC and to the gate of the IGBT Q3 in the negative half cycle as a trigger through the driving circuit 14 when the IGBT Q4 is perfectly turned on (saturated state) after passing the gradual increase term T1 has passed. As a result, the IGBT Q2 and the IGBT Q3 are respectively turned on in a brief term Tx. After passing the brief term Tx, a pulse signal is applied to the gate of the TRIAC Q1 as a trigger, so that the TRIAC Q1 is turned on.

The term, while the TRIAC Q1 is turned on, is continued near to the zero-cross point of the AC voltage at which a value of the current flowing in the TRIAC Q1 becomes equal to or smaller than a value of a holding current thereof. By repeating the sequential motion in each half cycle of the commercial power source AC, a phase controlled electric power is supplied to the incandescent lamp LA, so that the incandescent lamp LA is controlled to be the predetermined illuminance ratio set in the external input device 2.

While the IGBT Q2 serving as the second switching device is turned on, a current flows in a closed circuit configured in series of the commercial power source AC, the IGBT Q2, the ground, the power circuit 11, one diode of the diode bridge DB and the incandescent lamp LA. Alternatively, while the IGBT Q3 serving as the third switching device is turned on, a current flows in a closed circuit configured in series of the commercial power source AC, the incandescent lamp LA, the IGBT Q3, the ground, the power circuit 11 and one diode of the diode bridge DB. Both closed circuits include only one diode constituting the diode bridge DB.

The phase controller 1C in accordance with the third embodiment sets the gradual increase term T1 before the turning on of the TRIAC Q1 (see FIG. 5A) while the load voltage applied to the incandescent lamp LA is fluently increased through the IGBT Q4 serving as the self-quenching type fourth switching device, similar to the phase controller 1A in accordance with the first embodiment. In the gradual increase term T1, the phase controller 1B drives the IGBT Q4 in the sections divided in timeline from a predetermined phase. After passing the gradual increase term T1, the TRIAC Q1 serving as the first switching device is turned on. Thus, it is possible to overheat the self-quenching type switches and to downsize the phase controller 1C as a result.

Figure 19:
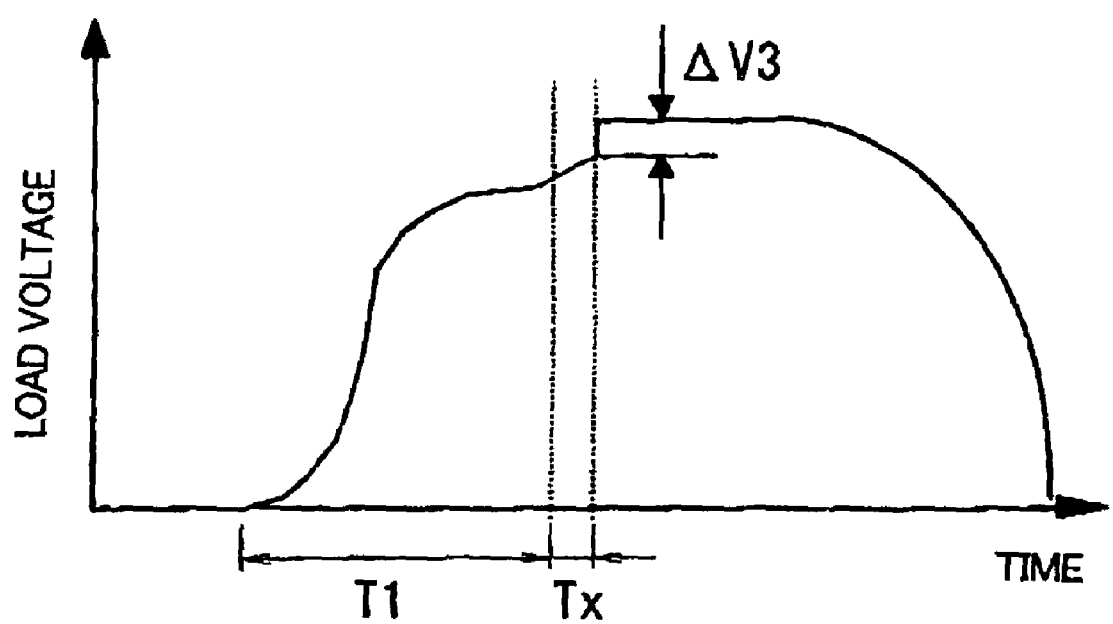
FIG. 19 is a waveform chart showing a voltage difference $\Delta V3$ between an ON voltage of the TRIAC and a sum of an ON voltage of the IGBT and ON voltages of two diodes in the phase controller in accordance with the third embodiment.

Furthermore, the phase controller 1C in accordance with the third embodiment turns on the IGBT Q2 serving as the second switching device or the IGBT Q3 serving as the third switching device in the brief term Tx before the turning on of the TRIAC Q1 after passing the gradual increase term T1. Thus, it is possible to reduce the number of the diode included in the closed circuit in which the current flows to only one. A voltage difference Δ V3 between an ON voltage of the TRIAC Q1 and a sum of an ON voltage of the IGBT Q2 or the IGBT Q3 and an ON voltage of one diode becomes smaller (see FIG. 19). Occurrence of the high frequency noise can be reduced, even when the capacity of the incandescent lamp LA is larger.

Still furthermore, the IGBT Q2 and the IGBT Q3 are driven in the brief term Tx, which is much smaller than the gradual increase term T1, so that the devices having a very small tolerance can be used as the IGBT Q2 and the IGBT Q3. The phase controller 1C can be downsized and made inexpensive.

Still furthermore, in the phase controller 1C in accordance with the third embodiment, the diodes constituting the diode bridge DB replaces the first and second diodes D1 and D2 in the phase controller 1B in accordance with the second embodiment, so that the circuit constitution of the phase controller 1C can be simplified and made inexpensive due to the cutback of the elements.

In the description, the IGBT Q4 is used as the self-quenching type fourth switching device. It, however, is possible to use a MOSFET as the fourth switching device instead of the IGBT.

Figure 20:
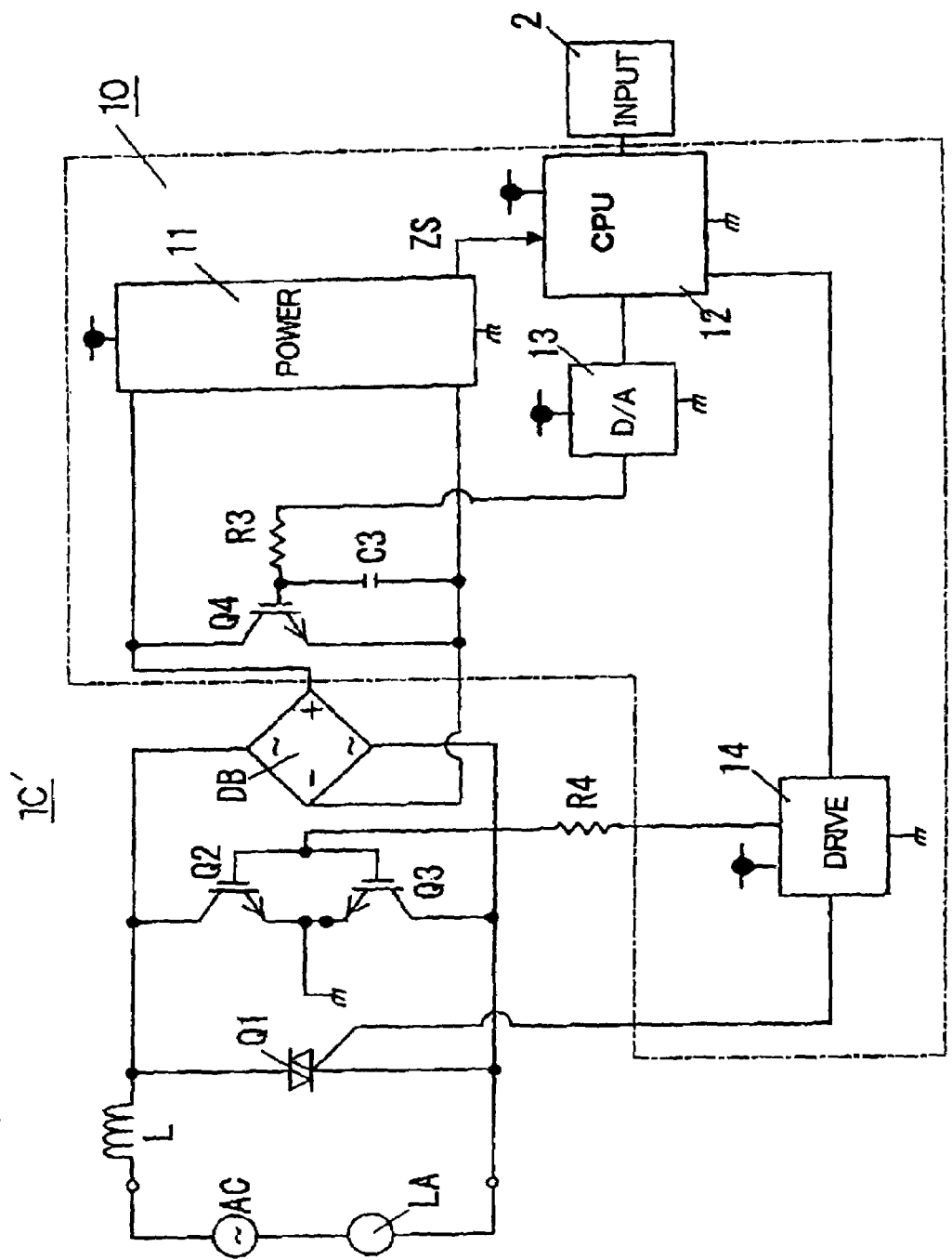
FIG. 20 is a circuit diagram showing a configuration of a phase controller in accordance with a modification of the third embodiment of the present invention.

A phase controller 1C' in accordance with a modification of the third embodiment is shown in FIG. 20. A reactance element L is connected between the commercial power source AC and the TRIAC Q1, so that occurrence of high frequency noise can be reduced, even though the circuit configuration of the phase controller 1C' becomes a little complex. Furthermore, since the voltage difference Δ V3 between the ON voltage of the TRIAC Q1 and the sum of an ON voltage of the IGBT Q2 or the IGBT Q3 and then ON voltage of the diode is made smaller owing to reducing the number of the diode included in the closed circuit in which the current flows, an element having a smaller inductance can be used as the reactance element L. Thus, it is possible to prevent the upsizing of the phase controller 1C'.

Fourth Embodiment

Figure 21:
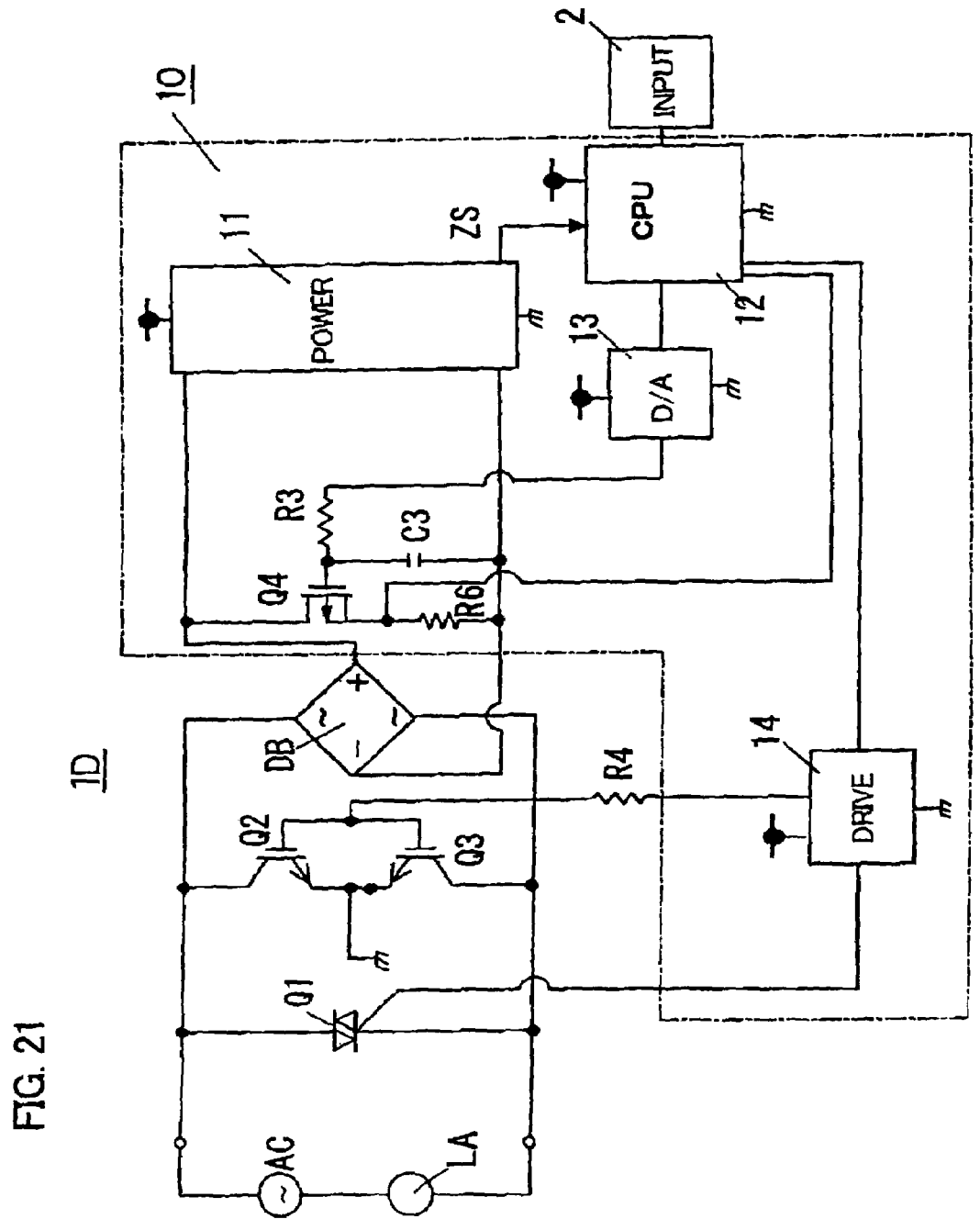
FIG. 21 is a circuit diagram showing a configuration of a phase controller in accordance with a fourth embodiment of the present invention.
Figure 22A:
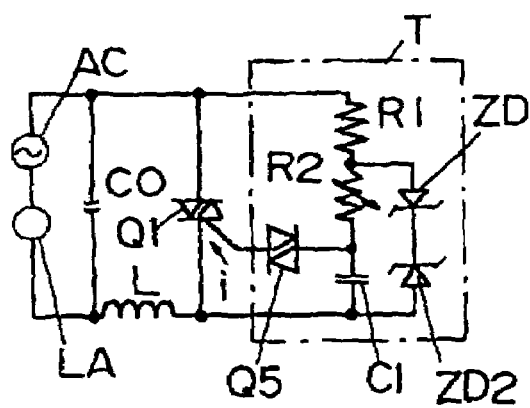
FIG. 22A is a circuit diagram showing a configuration of a conventional phase controller.
Figure 22B:
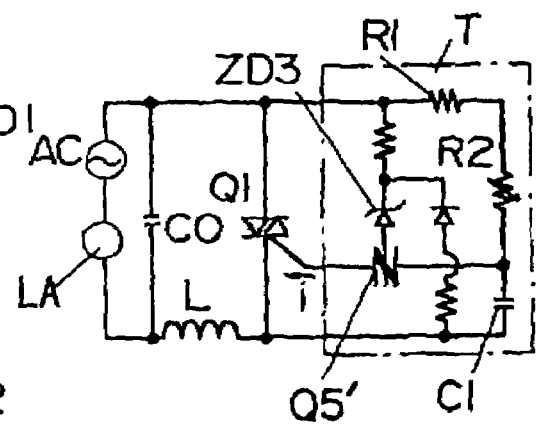
FIG. 22B is a circuit diagram showing a configuration of another conventional phase controller.
Figure 22C:
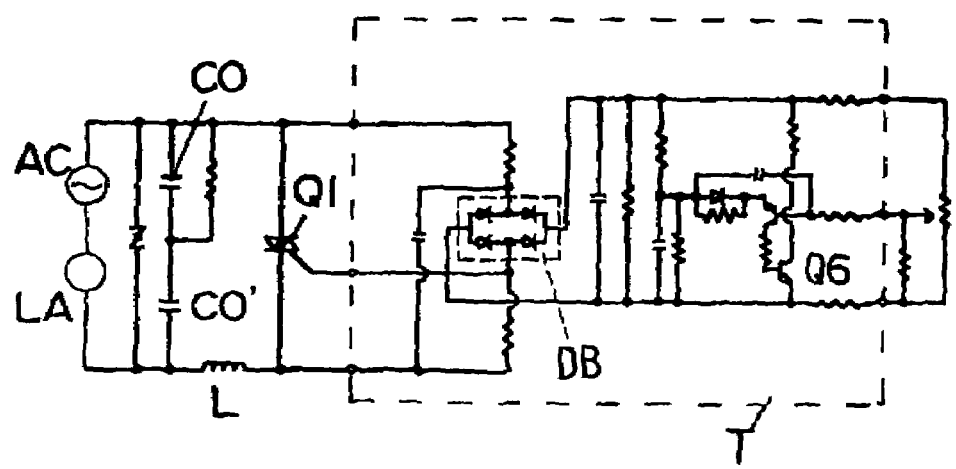
FIG. 22C is a circuit diagram showing a configuration of still another conventional phase controller.

A phase controller 1D in accordance with a fourth embodiment of the present invention is described with reference to FIG. 21. The phase controller 1D comprises a shunt resistor R6 described in the first embodiment further to the configuration of the phase controller 1C in accordance with the third embodiment. A MOSFET Q4 is used as the fourth switching device instead of the IGBT. The shunt resistor R6 is connected in series to the MOSFET Q4. The IGBT Q2, the IGBT Q3, the MOSFET Q4, the diode bridge DB, and so on serve as a load voltage increasing circuit gradually for increasing the load voltage applied to the incandescent lamp LA before the turning on of the TRIAC Q1 serving as the first switching device.

The CPU circuit 12 senses the load current flowing in the shunt current R6 through the diode bridge DB and the MOSFET Q4 as a voltage drop due to the shunt resistor R6 while the MOSFET Q4 is turned on. The CPU circuit 12 compares the value of the voltage drop and a predetermined reference voltage (threshold value), and changes the control manner after the gradual increase term T1 corresponding to the relation between the voltage drop and the threshold value. Hereupon, a first reference voltage corresponding to a very large load current, a second reference voltage corresponding to a very small load current equal to or smaller than a holding current of the TRIAC Q1 are memorized in a memory device (not shown) in the CPU circuit 12 as the threshold values.

The CPU circuit 12 compares the voltage of a sensed signal in the shunt resistor R6 wit the first reference voltage and the second reference voltage. When the voltage of the sensed signal is larger than the first reference voltage, the CPU circuit 12 turns on the IGBT Q2 serving as the second switching device or the IGBT Q3 serving as the third switching device in the brief term Tx after passing the gradual increase term T1, and turning on the TRIAC Q1 after the brief term Tx, similar to the phase controller 1C in accordance with the third embodiment. When the voltage of the sensed signal is equal to or smaller than the first reference voltage but larger than the second reference voltage, the CPU circuit 12 turns on the TRIAC Q1 after passing the gradual increase term T1 similar to the phase controller 1A in accordance with the first embodiment. When the voltage of the sensed signal is equal to or smaller than the second reference voltage, the CPU circuit 12 drives the MOSFET Q4 for flowing the load current instead of the TRIAC Q1 after passing the gradual increase term T1.

In other words, when the incandescent lamp LA, to which a large load current flows, is connected, the phase controller 1D execute substantially the same phase control as that of the phase controller 1B in accordance with the second embodiment, so that the occurrence of the high frequency noise can be reduced. When the incandescent lamp LA, to which a relatively small load current flows, is connected, the phase controller 1D does not drive the IGBT Q2 and the IGBT Q3 serving as the second and third switching devices, so that extra heat due to the IGBT Q2 and the IGBT Q3 can be prevented. Furthermore, when the incandescent lamp LA, to which a very small load current smaller than the holding current of the TRIAC Q1 flows, is connected, it is impossible to flow the load current owing to the TRIAC Q1. Thus, the phase controller 1D flows the load current owing to the MOSFET Q4 instead of the TRIAC Q1. The phase controller 1D in accordance with the fourth embodiment can respond to various capacitances of the incandescent lamps LA.

It is needless to say that the features of the above-mentioned first to fourth embodiments can be combined as needed.

This application is based on Japanese patent applications 2003-185744 filed Jun. 27, 2003 and 2003-284185 filed Jul. 31, 2003 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A phase controller connected between an AC power source and an incandescent lamp comprising:
    a first switching device configured by a reverse blocking thyristor or a bilateral thyristor;
    a load voltage increasing circuit connected in parallel with both terminals of the first switching device, including at least one self-quenching type switching device gradually for increasing a voltage applied to the incandescent lamp before turning on of the first switching device; and
    a control circuit for controlling the driving of the first switching device and the load voltage increasing circuit; wherein
    the control circuit sets a gradual increase term in a phase control operation during which the load voltage increasing circuit is driven gradually for increasing the voltage applied to the incandescent lamp from a predetermined phase angle, and turns on the first switching device after passing the gradual increase term.

2. The phase controller in accordance with claim 1, wherein
    the load voltage increasing circuit comprises a self-quenching type second switching device and a self-quenching type third switching device which are connected in parallel with both terminals of the first switching device in a manner so that turning on direction of the second switching device is opposite to that of the third switching device, a first diode connected back-to-back with the third switching device, and a second diode connected back-to-back with the second switching device; and
    the control circuit drives the second switching device and the third switching device alternately in the gradual increase term so that the load voltage applied to the incandescent lamp through the second switching device and the third switching device is gradually increased.

3. The phase controller in accordance with claim 2, wherein
    the second switching device and the third switching device are constituted by insulated gate bipolar transistor.

4. The phase controller in accordance with claim 2, wherein
    a load current sensor is further provided for sensing a load current flowing through the second switching device and the third switching device while the second switching device or the third switching device is turned on; and
    the control circuit compares a value of the load current sensed by the load current sensor with a predetermined reference value previously set, and supplies an electric power to the incandescent lamp by driving the second switching device or the third switching device when the sensed load current is smaller than a holding current of the first switching device.

5. The phase controller in accordance with claim 2, wherein
    a load current sensor is further provided for sensing a load current flowing through the self-quenching type switching device while the self-quenching type switching device of the load voltage increasing circuit is turned on; and
    the control circuit compares a value of the load current sensed by the load current sensor with a predetermined reference value previously set, and selects a driving manner for turning on the first switching device and the self-quenching type switching device corresponding to the result of comparison.

6. The phase controller in accordance with claim 1, wherein
    the load voltage increasing circuit comprises a self-quenching type second switching device and a self-quenching type third switching device which are connected in parallel with both terminals of the first switching device in a manner so that turning on direction of the second switching device is opposite to that of the third switching device, a self-quenching type fourth switching device connected in parallel with a series circuit of the second switching device and the third switching device, a first diode which is turned on while the second switching device is turned on and constitute a closed circuit from the commercial power source to the incandescent lamp through the second switching device, and a second diode which is turned on while the third switching device is turned on and constitute a closed circuit from the commercial power source to the incandescent lamp through the third switching device; and the control circuit drives the fourth switching device in the gradual increase term so that the load voltage applied to the incandescent lamp is gradually increased through the fourth switching device, drives the second switching device or the third switching device in a brief term after passing the gradual increase term, and turns on the first switching device after the passing brief term.

7. The phase controller in accordance with claim 6, wherein
a diode bridge is connected between the fourth switching device and the series circuit of the second switching device and the third switching device, and
the diodes constituting the diode bridge serve as a first diode connected back-to-back with the third switching device, and a second diode connected back-to-back with the second switching device.

8. The phase controller in accordance with claim 6, wherein
the second switching device and the third switching device are constituted by insulated gate bipolar transistor.

9. The phase controller in accordance with claim 6, wherein
a load current sensor is further provided for sensing a load current flowing through the fourth switching device while the fourth switching device is turned on; and
the control circuit compares a value of the load current sensed by the load current sensor with a predetermined reference value previously set, and supplies an electric power to the incandescent lamp by driving the fourth switching device when the sensed load current is smaller than a holding current of the first switching device.

10. The phase controller in accordance with claim 6, wherein
a load current sensor is further provided for sensing a load current flowing through the self-quenching type switching device while the self-quenching type switching device of the load voltage increasing circuit is turned on; and
the control circuit compares a value of the load current sensed by the load current sensor with a predetermined reference value previously set, and selects a driving manner for turning on the first switching device and the self-quenching type switching device corresponding to the result of comparison.

11. The phase controller in accordance with claim 1, wherein
a reactance element for noise reduction is connected in a circuit from the commercial power source to the first switching device.

12. The phase controller in accordance with claim 1, wherein
a load current sensor is further provided for sensing a load current flowing through the self-quenching type switching device while the self-quenching type switching device of the load voltage increasing circuit is turned on; and
the control circuit compares a value of the load current sensed by the load current sensor with a predetermined reference value previously set, and selects a driving manner for turning on the first switching device and the self-quenching type switching device corresponding to the result of comparison.

13. The phase controller in accordance with claim 12, wherein
the control circuit executes the following operations in the phase control:
setting a current sensing term in a predetermined term from a start of the phase control during which a predetermined number of current sensing operation is executed by briefly turning on the self-quenching type switching device of the load voltage increasing circuit at a predetermined phase angle of the commercial power source;
comparing a sensed value from the load current sensor with a plurality of predetermined reference values in the current sensing term;
setting a preheating term after the current sensing term is completed when the sensed value is larger than a reference value corresponding to an inrush current of the incandescent lamp but equal to or smaller than another reference value corresponding to a short circuit current, during which only the first switching device is turned on at a predetermined phase angle of the commercial power source;
setting the gradual increase term after completing the preheating term, during which the self-quenching type switching device of the load voltage increasing circuit is driven at the predetermined phase angle so as to increase the load voltage applied to the incandescent lamp gradually through the self-quenching type switching device, and turning on the first switching devoice after passing the gradual increase term; and
stopping the phase control operation when the sensed value is larger than still another reference value corresponding to the short circuit current.

14. The phase controller in accordance with claim 12, wherein
the phase angle at which the self-quenching type switching device of the load voltage increasing circuit is turned on in the current sensing term is selected near to a zero-cross point of an AC voltage.

15. The phase controller in accordance with claim 12, wherein
a plurality of phase angles at which the self-quenching type switching device of the load voltage increasing circuit is turned on is set in the current sensing term;
the load current is sensed by the load current sensor by changing the phase angle at each current sensing operation in the same current sensing term;
the control circuit compares the sensed value from the load current sensor with a reference value corresponding to each phase angle, and selects a driving manner for turning on the first switching device and the self-quenching type switching device corresponding to the result of comparison.

16. The phase controller in accordance with claim 12, wherein the load voltage is gradually increased by driving the self-quenching type switching device of the load voltage increasing circuit during the current sensing operation.

17. The phase controller in accordance with claim 12, wherein a phase angle at which the first switching device is turned on in the preheating term is selected near to a phase angle which is set corresponding to a phase control of the incandescent lamp.

18. The phase controller in accordance with claim 12, wherein a phase angle at which the first switching device is turned on in the preheating term is selected near to a phase angle which is set corresponding to a phase control of the incandescent lamp; and the phase angles are gradually increased from start to complete of the preheating term.

19. The phase controller in accordance with claim 12, wherein the control circuit further executing the following operations:

setting a current sensing term again after completing the preheating term;

judging whether the sensed value from the load current sensor is larger than a reference value corresponding to an inrush current of the incandescent lamp in newly set current sensing term;

setting a preheating term again when the sensed value is larger than the reference value; and repeating the setting the current sensing term and the preheating term until the sensed value from the load current sensor becomes equal to or smaller than the inrush current of the incandescent lamp.

20. The phase controller in accordance with claim 12, wherein the control circuit comprises a memory for memorizing sensed values from the load current sensor; and the control circuit executes the following operations:

comparing the previous sensed value memorized in the memory and the sensed value in this time;

judging that the load current is due to an inrush current of the incandescent lamp when there is a difference between them;

judging that the load current is due to a short circuit current when there is no difference between them;

setting the preheating term when the load current is due to the inrush current of the incandescent lamp; and stopping the phase control operation when the load current is due to the short circuit current.

* * * * *